US011001205B2

(12) United States Patent
Reed, III

(10) Patent No.: US 11,001,205 B2
(45) Date of Patent: *May 11, 2021

(54) PICKUP TRUCK MOUNTED TOOLBOX

(71) Applicant: Thomas Inard Reed, III, Aurora, CO (US)

(72) Inventor: Thomas Inard Reed, III, Aurora, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 16/748,603

(22) Filed: Jan. 21, 2020

(65) Prior Publication Data
US 2020/0156555 A1 May 21, 2020

Related U.S. Application Data

(63) Continuation-in-part of application No. 15/985,636, filed on May 21, 2018, now abandoned, which is a continuation-in-part of application No. 15/245,696, filed on Aug. 24, 2016, now Pat. No. 10,000,165, which is a continuation-in-part of application No. 14/578,029, filed on Dec. 19, 2014, now Pat. No. 9,499,106.

(60) Provisional application No. 61/964,000, filed on Dec. 20, 2013.

(51) Int. Cl.
*B60R 9/06* (2006.01)
*B60R 11/06* (2006.01)

(52) U.S. Cl.
CPC .............. *B60R 9/065* (2013.01); *B60R 11/06* (2013.01)

(58) Field of Classification Search
CPC ..... B60R 9/00; B60R 11/06; B60R 2011/004; B60R 11/00; B60R 2011/0042; B60R 9/065
USPC ........... 224/404, 414.1, 423; D12/414.1, 423
See application file for complete search history.

(56) References Cited

U.S. PATENT DOCUMENTS

| | | | |
|---|---|---|---|
| 2,849,201 A | 8/1958 | Schelgunov | |
| D257,340 S * | 10/1980 | Grossman | D12/414.1 |
| 4,420,238 A | 12/1983 | Felix | |
| 5,018,779 A | 5/1991 | Lund | |
| D320,372 S | 10/1991 | Alberts | |
| 5,258,893 A * | 11/1993 | Finneyfrock | B60Q 1/30 280/748 |
| 5,297,707 A * | 3/1994 | Weber | B60R 9/00 224/404 |
| D369,140 S | 4/1996 | Sills | |
| D374,654 S * | 10/1996 | Steketee | D12/414.1 |
| 5,685,467 A * | 11/1997 | Niemi | B60R 9/00 220/23.83 |
| 6,082,804 A * | 7/2000 | Schlachter | B60R 9/00 224/281 |

(Continued)

Primary Examiner — Adam J Waggenspack
(74) Attorney, Agent, or Firm — Craig Barber; Barber Legal

(57) ABSTRACT

A pickup truck toolbox can be mounted to the bed side rails by a variety of interchangeable feet rather than arms and may sit above the bed, thus allowing use of the full volume of the bed, for example for 4'×8' sheets of building material. It may have a rear view tunnel through it either top or bottom, whereby the driver may use normally the rear view mirror, and may have a Liddy light valley across the top, whereby the brake light will remain visible. A bed light or rear view camera may be employed as well. A fairing may be employed to improve fuel efficiency.

14 Claims, 42 Drawing Sheets

(56) References Cited

U.S. PATENT DOCUMENTS

| | | | |
|---|---|---|---|
| 6,152,513 A * | 11/2000 | Karrer | B60P 1/54 |
| | | | 224/404 |
| 6,234,559 B1 * | 5/2001 | Block | B60J 7/1621 |
| | | | 296/100.06 |
| 6,616,210 B1 | 9/2003 | Massey | |
| 6,726,074 B2 | 4/2004 | Boys | |
| 6,913,304 B1 * | 7/2005 | Sweet | B60R 16/0231 |
| | | | 211/20 |
| 8,038,195 B1 | 10/2011 | Hutcheson | |
| 8,348,331 B2 * | 1/2013 | Holt | B60R 9/00 |
| | | | 296/183.1 |
| 2003/0230909 A1 | 12/2003 | Melius | |
| 2005/0121931 A1 * | 6/2005 | Waye | B60R 9/00 |
| | | | 296/37.6 |
| 2009/0127305 A1 * | 5/2009 | Ropp | B60P 1/003 |
| | | | 224/404 |
| 2013/0021453 A1 | 1/2013 | Gignac | |
| 2013/0181023 A1 | 7/2013 | Shawanda | |
| 2014/0117062 A1 | 5/2014 | Kraeuter | |

\* cited by examiner

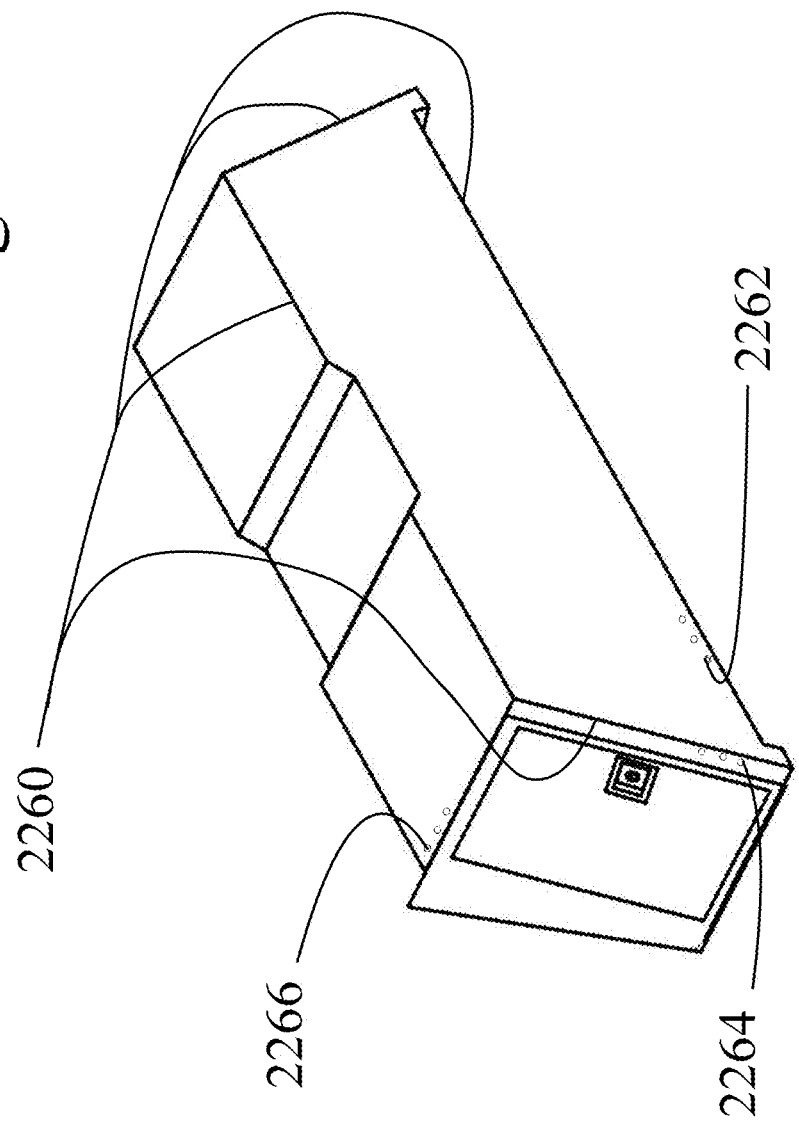

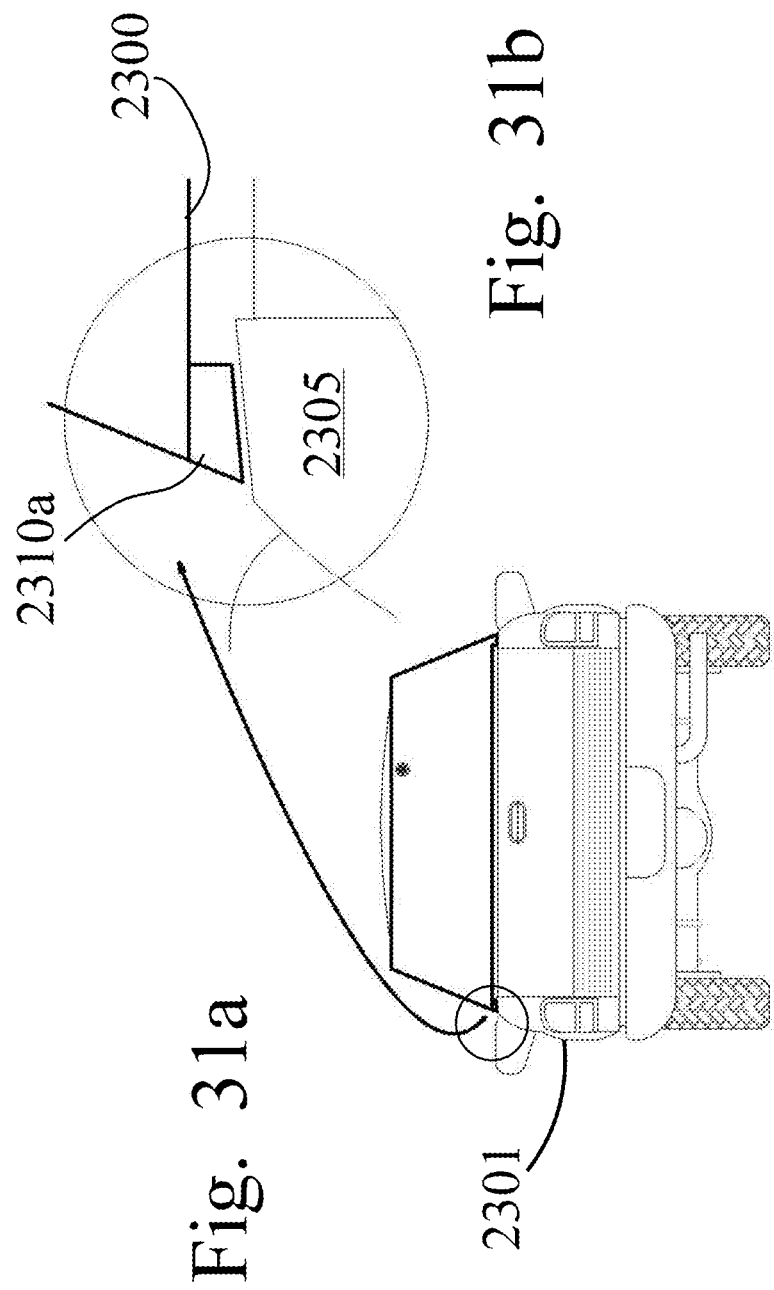

PICKUP TRUCK MOUNTED TOOLBOX

STATEMENT REGARDING FEDERALLY FUNDED RESEARCH

This invention was not made under contract with an agency of the US Government, nor by any agency of the US Government.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

CROSS-REFERENCE TO RELATED APPLICATIONS

This invention claims the derived priority and benefit of U.S. Patent Application No. 61/964,000 filed Dec. 20, 2013 in the name of the same inventor, Thomas Inard Reed III, and entitled "Topbox" of which the entire application including disclosures are incorporated herein by reference, by means of claiming the priority and benefit of co-pending U.S. Utility application Ser. No. 14/578,029 filed Dec. 19, 2014, in the name of the same inventor, Thomas Inard Reed III, entitled "Pickup Truck Mounted Toolbox", of which the entire application including disclosures are incorporated herein by this reference, and further via U.S. Utility application Ser. No. 15/245,696 filed Aug. 24, 2016, in the name of the same inventor and having the same title, of which the entire application including disclosures are incorporated herein by this reference, and yet further via U.S. Utility application Ser. No. 15/985,636 filed May 21, 2018 in the name of the same inventor and having the same title, of which the entire application including disclosures are incorporated herein by this reference, and of which this application is a continuation-in-part.

FIELD OF THE INVENTION

This invention relates generally to toolboxes, and specifically to toolboxes mounted behind the cabs of pickup trucks.

BACKGROUND OF THE INVENTION

Toolboxes for pickup truck usage are large boxes which extend into the bed volume of a pickup truck, that is, the toolbox sits projecting downward between the side rails of the pickup truck bed, with a pair of arms on the upper end which arms extend outward to sit upon the tops of the side rails of the bed.

This means that the space behind the cab is used only for visibility while the bed space is semi-permanently occupied by the toolbox, that is, the toolbox forces the dedication of a substantial portion of the bed volume to itself. The toolbox is a very heavy device and it is not practical to frequently install and remove it: once installed, it is nearly permanent. Thus the user loses a portion of the benefit of having a pickup truck.

There is one particular usage of the bed of a pickup truck which is so common that it is in fact the basis for the sizing of many "standard" pickup truck beds. Many building materials such as wallboard, plywood and so on come in sheets which are standardized size of 4'×8' (48" by 96"). An unoccupied truck bed may be used to convey a stack of these items. For example a stack of a dozen sheets of sheetrock would be about a foot high in the bed volume.

However, when a standard style of toolbox is installed, it usually reaches either to the bed of the truck or to a position barely above it. Some references actually teach feet which land on the bed even though bottom of the standard toolbox misses by a few inches.

An example of a conventional prior art pickup truck toolbox may be seen in FIG. 9, labeled PRIOR ART.

Cab 54 and bed 20 meet at the front end of the bed 20 and the toolbox is disposed at that location. Arm 12 sits atop the side rails 10 of the bed 20, however, the body of the toolbox extends downward into the bed volume 20 until it comes to rest on the floor of the bed or perhaps just above the floor of the bed 20.

PRIOR ART FIG. 8 shows this as well: the toolbox extends completely into the bed, preventing the use of the bed for storage. Thus the gate 203 at the end of the bed must be opened for longer cargo, or the cargo must be placed with one or both ends above the toolbox or gate, rendering the vehicle difficult to drive and offering the chance that the cargo (such as motorcycle 114) might fall out.

Tonneau cover 14 may be seen in FIG. 9 to be opened and the prior art toolbox extends so far down into the bed volume that it is actually visible UNDER the tonneau cover 14. It is worth noting that the tonneau cover 14 must be shorter than the length of the bed 20 in order to allow for the length of the toolbox.

Finally, it will be seen that the top-mounted hatch 50 opens upward. This means that a user of the toolbox must open the hatch and then reach down in order to rummage for the desired tool. Obviously given the configuration seen, shelves would be difficult to employ since the topmost shelf would block the view of all the lower shelves.

In alternative configurations, the top hatch is broken into two smaller hatches with are hinged at the middle of the width of the toolbox, so they open upward from the side, not from the back of the toolbox.

It may be seen that having doors on the sides of the toolbox is impossible, since they could not open due to the presence of the side rails, blocking them.

The toolbox shown could not be raised up and placed over the bed of the pickup truck for a number of reasons. First, it would entirely block the view of the driver to the rear, preventing any usage of the rear view mirror. Second, it would prevent drivers and pedestrians behind the pickup from seeing the center high mounted brake light (not shown by the prior art FIG. 9). In addition, the arms which project from the top of the toolbox would not secure it to the sidewalls. Finally, the top opening hatch would no longer be accessible without climbing on top of the roof of the cab of the truck or by removing the tonneau to allow entering the bed and then walking forward to the toolbox.

One example of an alternative type of toolbox may be found at www.quickdrawtoolboxes.com, which shows a gun safe or tool box for placement across the back of a flat bed or pickup truck. This type of box has a low profile to avoid interfering with the field of view of the rear view mirror and to avoid blocking visibility of the third brake light. Another example may be found at http://www.americantruckboxes-.com/customtoolboxes.html, showing a box with doors hinging upward, but no safety tunnel.

However, this box does not teach any way to increase the height safely and thus to increase cargo capacity upward.

In addition, it has a sliding rack mechanism to bring out racks/bins (either gun racks in the gun embodiment, or tool bins in the others). This sliding mechanism is required in order to offer access to space near the centerline of the bed, but the mechanism comes at a cost in weight. It also takes up space within the box (which as noted cannot be very tall for safety reasons), adds cost in manufacturing, and requires a large amount of space on the side of the parked vehicle in order to be opened at all. Such mechanisms are subject to jamming, of course, rather like a kitchen drawer.

Worst of all, it is easy to imagine the sliding bin mechanism popping out as the vehicle goes around a corner, after which the vehicle will have a projection apparently in excess of four feet wide sticking out one side.

Finally, horizontal shelves are once again impossible in this design.

U.S. Pat. No. 5,685,467 (Niemi) teaches a typical design which sits inside of a cargo bed. Niemi very explicitly teaches legs which sit on the floor of the bed, "spaced apart" (four feet is mentioned repeatedly in Niemi) and which fit within the sidewalls "independent" of the sidewalls. Thus this application absolutely prevents using a truck bed for 4'×8' sheets of building material.

U.S. Pat. No. D374654 to Steketee (Oct. 15, 1996) teaches a truck mounted toolbox having no feet and lacking any tunnel which extends from the bottom upward.

U.S. Design Pat. No. D369,140 to Sills (Apr. 23, 1996) teaches a truck bed mounted toolbox having feet projecting downward from the body to the bed of the pickup truck, and wide flanges on the top which rest on the pickup truck siderails.

The same applicant (Reed III) has, in this same patent family, non-prior art references which teach keeping the entire bed volume empty of the toolbox and thus available for use. However, further experience has shown that in fact some limited projection downward into the bed volume is acceptable, as long as a reasonable amount of space is left between the bottom of the toolbox (the depth of the toolbox) and the bed of the truck. This gap may be quite large (or a small downward projection) or the gap may be more moderate (meaning a deeper downward projection). A projection down even a foot leaves adequate space for a large number of sheets of building material to slide underneath the box.

The advantage of partially projecting into the bed volume, in addition to extending upward to roughly follow the cab outline, is additional storage space in the box.

Thus it would be preferable to provide a pickup toolbox which does not take up any bed space on the floor of the bed of the truck, leaving a gap between the toolbox and the bed and yet having a large storage capacity due to extending both upward and downward from the top of the siderails.

It would even more be preferable to provide a pickup tool box or storage box which has interchangable or adjustable feet so that it can fit onto various types of pickup truck beds, so long as they are the same width.

It would further be preferable to provide a pickup truck storage box/tool box which has a lower profile and lower weight for smaller tool/storage needs.

It would further be preferable to provide a pickup toolbox which allows easy access without rummaging downward, by means of having shelving within the body or any downward extension.

It would further be preferable to provide a pickup toolbox which does not require the use of a tonneau of a different size than the bed volume's top surface.

It would further be preferable to provide a pickup toolbox which allows the use of shelving for tools, but without blocking the view of users.

It would further be preferable to provide a pickup toolbox which meets all of these requirements and yet fulfills basic safety standards by not blocking the view of the third brake light.

It would further be preferable to provide a pickup toolbox which meets all of these requirements and yet fulfills basic safety standards by not blocking the usage by the driver of the rear view mirror.

It would further be preferable to provide a pickup truck tool box/storage box which has a visibility tunnel either extending up from the bottom surface or down from the top surface.

It would yet further be preferable to provide a pickup truck tool/storage box which offers an extra CHSML light, a bed light, a rear view camera, or combinations thereof in a single housing.

SUMMARY OF THE INVENTION

General Summary

The present invention teaches a pickup truck toolbox which can be mounted to the bed side rails and sit well above them, and for additional storage space projecting downward a limited distance into the bed volume. (A limited distance may be an inch or a foot, so long as the box provides a great deal of space ABOVE side rail level, at the level of the cab.) The toolbox is secured to the top of the siderails by the ends or by feet disposed on the bottom ends of the toolbox. This allows for a wider box—since conventional boxes must sit in between the side rails, they must be narrower than the side rails, whereas the toolbox of the present invention sits above the side rails and projects out to their edges in embodiments, with two projections downward into the volume and a great deal of space behind the cab rear window.

Since the present invention may sit above the side rails and the bed volume, it need occupy only some of the space between the side rails thus allowing use of the full volume of the bed in the lower space defined between the bottom of the downward projections of the box, the truck side rails and the floor of the bed. By this means the cargo capacity of the pickup truck is reduced by a smaller factor than for conventional toolboxes.

Since the toolbox sits above the side rails and behind the cab of the pickup truck, safety issues may arise, in particular from blockage of either the view of the driver when using the rear view mirror or from blocking visibility of the center mounted third brake light to other drivers. However, the invention may have a rear view tunnel through the lower portions, whereby the driver may use normally the rear view mirror, and may have a Liddy light valley across the top, whereby the brake light will remain visible to others behind the vehicle.

Fuel efficiency is always an issue when discussing truck equipment. In particular, profile (meaning herein frontal profile or frontal cross-section) must be maintained to be within the original profile of the truck cab. The profile of the toolbox of the present invention may generally match, be similar to, or sit within, the profile of the cab of the truck.

Furthermore, a fairing may be employed to improve fuel efficiency by eliminating the space between the pickup cab and the toolbox and thus preventing the swirl of air therebetween.

Side-mounted vertical hatches may allow both easier access than conventional toolboxes for pickups which open upward. The side mounted vertical hatched even allow the use of shelving within the interior space of the toolbox of the invention, thus allowing superior organization of tools and extremely efficient utilization of space, as well as convenience of access. The shelves may be removable, so that a larger space can be created when necessary.

Because the bottom extensions extend below the level of the side rails (and thus below the side doors) shelving may advantageously be used within the bottom extensions as well. Removable and adjustable shelving which the user can easily reposition is advantageous for the same reason: providing easy access to the deeper space of the bottom extensions.

The invention may be embodied as a flat package with the larger components stacked flat therein and with apertures for holes around the perimeters of the pieces, for fastening together at a remote final assembly location.

Longitudinal feet on the invention may be customized for the different configurations (especially angle to the horizontal) of different truck makes.

Summary in Reference to the Claims

It is therefore another aspect, embodiment, advantage and objective of the present invention, in addition to those mentioned previously and those mentioned below, to provide a storage box storage box for use on a pickup truck having a bed, the bed having one floor, the floor having a bed width, two side rails separated by the bed width, the side rails having side rail tops defining a bed height and a bed volume, the side rail tops having an angle to the horizontal, the pickup truck also having a cab profile and a cab height, a rear view mirror, and a third brake light, the storage box comprising:

a body having a storage box length, one top surface, one front wall, one rear wall, two bottom ends and two sides separated by a rear view tunnel passing through the body between the two sides, the rear view tunnel having a rear view tunnel width;

at least one side having at least one bottom extension projecting downward into such bed volume and the rear view tunnel rising above such bed height, the rear view tunnel dimensioned and configured to allow usage of such rear view mirror, the at least one bottom extension having a bottom extension width;

the two bottom ends separated by such bed width, the two bottom ends having bottom end widths, the two bottom ends dimensioned and configured to rest upon such side rail tops;

a first partial width defined as a width of the rear view tunnel plus the two bottom end widths, the first partial width less than such bed width;

whereby when the two bottom ends rest upon such side rail tops the bottom extension projects downward into such bed volume.

It is therefore another aspect, embodiment, advantage and objective of the present invention to provide a storage box further comprising:

each foot located at the edge of the respective bottom end; each foot having a foot top attached to each respective bottom end of the box, and each foot having a foot bottom having an angle equal to such side rail tops angle;

each foot having a foot length, the foot length being greater than one half of the storage box length.

It is therefore another aspect, embodiment, advantage and objective of the present invention to provide a storage box the foot length further comprising the storage box length.

It is therefore another aspect, embodiment, advantage and objective of the present invention to provide a storage box for use with side rail tops having an angle to the horizontal characteristic of a second particular brand of pickup truck, the storage box further comprising:

third and fourth feet each having a foot top, foot first and second sides, and each foot having a foot bottom having an angle to equal to such side rail tops angle of such second particular brand of pickup truck;

each foot having a foot length equal to the storage box length.

It is therefore another aspect, embodiment, advantage and objective of the present invention to provide a storage box further comprising:

a first transparent window of polymer material in the rear view tunnel.

It is therefore another aspect, embodiment, advantage and objective of the present invention to provide a storage box wherein the storage box is further dimensioned and configured to match such cab profile of such pickup truck, whereby aerodynamic drag of the storage box is minimized.

It is therefore another aspect, embodiment, advantage and objective of the present invention to provide a storage box further comprising:

a third brake light visibility feature, wherein the third brake light visibility feature further comprises:

a channel across the top surface, the channel dimensioned and configured to allow such third brake light of such pickup truck to be visible despite the presence of the storage box.

It is therefore another aspect, embodiment, advantage and objective of the present invention to provide a storage box further comprising: a storage-box-to-cab fairing extending from the storage box to the cab.

It is therefore another aspect, embodiment, advantage and objective of the present invention to provide a storage box further comprising:

at least one removable shelf disposed within the body.

It is therefore another aspect, embodiment, advantage and objective of the present invention to provide a storage box further comprising:

at least one removable shelf disposed within at least one of the bottom extensions.

It is therefore one more embodiment, advantage and objective of the present invention to provide a storage box wherein the bottom extension further comprises:

a bottom extension depth into such bed volume, wherein the bottom extension depth is less than such bed height, whereby a depth of bed volume below the extension is created.

It is therefore yet one more embodiment, aspect, advantage and objective of the present invention to provide a storage box further comprising:

a bed illumination light attached to the storage box and disposed so as to illuminate such bed of such pickup truck, the bed illumination light also being attached and powered by the electrical connector.

It is therefore one more embodiment, aspect, advantage and objective of the present invention to provide a storage box further comprising:

a second bottom extension projecting downward into such bed volume.

It is therefore one more embodiment, aspect, advantage and objective of the present invention to provide a storage box for use on a pickup truck having a bed, the bed having two side rails separated by a bed width, the side rails having side rail tops defining a bed height and a bed volume, the side rail tops having an angle to the horizontal characteristic of a first particular brand of pickup truck, the pickup truck also having a cab profile and a cab height, a rear view mirror, and a third brake light, the storage box comprising:

a body having a top surface, a top surface, a front wall, a rear wall, a storage box height, a storage box width, and a storage box length, and the storage box width equal to such bed width, each bottom end having a bottom end edge along such side rail tops, whereby the two bottom end edges are disposed separated from one another by such bed width.

two bottom extensions separated by a rear view tunnel passing through the body between the two bottom extensions;

the two bottom extensions projecting downward into such bed volume and the rear view tunnel rising above such bed height, the rear view tunnel dimensioned and configured to allow usage of such rear view mirror;

whereby when the two bottom ends rest upon such side rail tops the two bottom extensions project downward into such bed volume.

BRIEF DESCRIPTION OF THE DRAWINGS

FIG. 7 is a partially cut-away side view of an embodiment of the invention with another motorcycle for cargo, while

FIG. 30 is an elevated orthogonal view of an embodiment having only feet.

FIG. 31a, 31b are a rear view of a pickup truck with the invention mounted, including a detail call-out view showing how a pickup truck siderail may in some brands of truck be angled, thus necessitating angled feet.

INDEX TO REFERENCE NUMERALS

Figure 1:
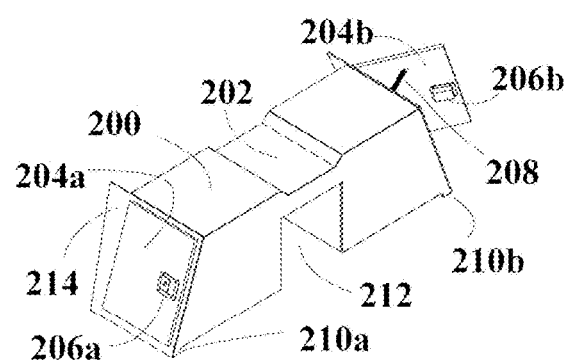
FIG. 1 is an elevated orthogonal view of a preferred embodiment of the toolbox of the present invention.

Side rail 10
Arm 12
Tonneau cover (special size) 14
Bed volume 20
Top opening hatch 50
Cab 54
Conventional toolbox 99
Body 100
Motorcycle 114
Motorcycle rear wheel 114b
Liddy light (CHSML) 120
First embodiment 200
Pickup 201
Brake light valley 202
Gate 203
Side-mounted hatches 204a, 204b
Door latches 206a, 206b
Door spring lock 208
Feet 210a, 210b
Rear view tunnel 212
Toolbox-to-cab fairing 214
Side shelves left/right 216a, 216b
Center shelf 218
Horizontal motion of removable shelf 220
Vertical space 222
Truck bed (vacant) 224
Sliding tonneau cover 226
Body 300
Top hatch 301
Auxiliary brake lights 302
Bed illumination light 304
Wiring 306
Camera 308
Box bottom surface fixed on rail top 410a, 410b, 410c, 410d
Bottom surface (unbroken) 412
Bottom surfaces first & second 512a
Tunnel, elevated bottom surface 514
Box bottom surface ends 620, 622
Body 624
Truck CHSML 626
Truck rear view mirror 628
Body 700
Brake light valley 702
Side-mounted hatches 704a, 704b
Door latches 706a, 706b
Door spring lock 708
Rear view tunnel 712
Storage box-to-cab fairing 714
Body 800
Brake light valley 802
Side-mounted hatches 804a, 804b
Door latches 806a, 806b
Door spring lock 808 CHSML/Rear view cam/bed light combined 812
Storage box-to-cab fairing 814
Body 900
Interchangeable feet sets 902, 904, 906, 908
Body 1000
CHSML/accessory 1002
Body 1100
LED light 1102
Half height body 1200
Bed side rail height 1202
Cab height 1204
Body 1300
Side doors 1302
Feet 1306
Body 1400
Top door 1402
Box 2000
Third brake light visibility feature 2002
Hatch 2004a
Latch 2006a
Top surface 2007
Tunnel 2009
Feet 2010a, 2010b
Tunnel wall 2012
Left side 2014
Aperture window 2015
Rear wall 2017
Box surface bottom ends 2020, 2022
Rear view mirror 2049
Foot length 2050
Box length 2052
Box bottom end edge 2054
Bed light 2108
Brake light feature 2120
Interchangeable feet 2202, 2204, 2206, 2208
Perimeter 2260
Fastener hole 2262
Fasteners 2264, 2266
Box 2300
Truck 2301
Siderail top, angled 2305
Foot 2310a
Top surface of foot 2336
Bottom surface of foot 2338
Left side of foot 2340
Right side of foot 2342

Shipping box bottom 3302
Shipping box top 3304
Front wall 3306
Hatch 3308
Fasteners 3310
Stack 3312
Toolbox 4000
Pickup 4001
Feet 4010
Footless bottoms 4012
Shelf 4016
Shelf 4017
Truck bed/volume 4024
Downward extension 4100
Deeper extension 4102
Depth of extension 4104
Width of extension 4106
Total depth of bed volume 4108
Depth of bed volume below extension 4110
Toolbox interior right 4112
Toolbox interior left 4114
Volume of bed converted to toolbox space 4150

DETAILED DESCRIPTION

Glossary

As used herein a toolbox is a container specialized for holding tools, having characteristics which suit it for this particular purpose and make it preferable to general purpose containers. Thus most toolboxes are made of extremely durable materials such as sheet metal (and the toolbox of the present invention is also made of sheet metal stock in the preferred embodiment) or of extremely rugged polymers. For example, aluminum and steel and alloys of either one may be preferable. Toolboxes normally have provisions for locking mechanisms to prevent theft of tools, usually have divided spaces to allow sorting of tools by type or size and so on.

As used herein a pickup truck is a vehicle having a cab for human occupancy with a bed behind the cab. The bed normally is a large volume for hauling cargo, the volume defined by the side walls on either side. Many pickup trucks in fact sacrifice a second row of seats in order to extend the bed and thus increase cargo capacity. In addition, pickup trucks are distinguished from flat-bed trucks by having raised side-rails on each side of the bed and separated by the width of the bed. The side-rails allow cargo to be secured more easily, and small, heavy cargo can even be placed into the truck bed without further securing. Larger cargo, such as the motorcycle shown in the accompanying figures, may be secured by means of apertures or tie downs mounted on the side rails. These rail apertures may also be used to receive the feet of the present invention.

The total depth of bed volume refers to the vertical clearance of the pickup truck from the floor of the bed up to the siderails.

As used herein the term cab profile refers to the frontal view in both area and shape of the cab portion of the pickup truck. This cab profile may be seen in the accompanying diagrams. It will be appreciated that a key determiner of vehicular gasoline efficiency is frontal area and shape. In order to maximize fuel efficiency, the toolbox of the present invention is designed to mimic the cab profile both in frontal view area and frontal view shape, as can be seen in the accompanying diagrams. Note that is a general mimicry only, as the rear-view tunnel, and the brake light channel both alter the profile of the toolbox as shown in the diagrams to be smaller than the profile of the cab depicted, and to remain within the cab profile. Thus the toolbox profile may exactly match, partially match, be similar to, or simply sit within, the profile of the cab of the pickup truck.

A rear view mirror for the present disclosure's purposes refers to that mirror which is mounted within the cab and used to view either the bed of the pickup truck or the area behind the vehicle.

Usage of such rear view mirror refers to the ability of a vehicle driver, seated normally in the driver's seat of the cab, to look into the mirror and see some or all of the normal view offered by the mirror due to the presence of the rear view tunnel through the bottom surface of the body of the toolbox of the invention.

As used herein a downward extension refers to a portion of the bottom of the toolbox which extends downward from the side rails of the pickup truck (and is thus lower than the feet or footless ends of the invention). The downward extension need not be any particular depth. The depth of the extension is that distance below the side rail tops which the bottom extension projects into the bed volume. The width of the extension refers to the width of the bottom extension into the bed, which need not be the same as the width of the bed, and when interrupted by the tunnel, is not the same as the width of the toolbox.

Subtracting from the total depth of the bed the depth of the bottom extension provides the depth of the bed volume below the extension. This space can be used to haul cargo which requires the full footprint of the bed.

The toolbox interior is split by the tunnel into two parts, the right and the left. A small passage above the tunnel also exists.

The rear view tunnel may be an inverted channel, having a length and width, passing across the bottom surface of the body of the toolbox entirely from front to rear and thus allowing the normal usage of the rear view mirror.

The "third brake light" or CHMSL, "center high mounted stop lamp" refers to a vehicular safety light used for indicating that the brake pedal has been pushed. In the past, two lights, mounted on the side rails at the rear end of the pickup truck, were normal. The third brake light, mounted upon the top, center, rear of the cab of a vehicle, added significantly to the visibility of such lights and thus increased vehicular safety. It is estimated that the reduction in rear-end collisions may be as high as 5% due to CHMSL lights.

For purposes of this application, "bed side rail height" refers to the top of the side rails of a pickup truck bed. Thus the bed height/bed side rail height is usually a visual straight line from rail top to rail top. A "cab height" is the further distance from the bed height up to the top of the cab, which distance is usually taken up by a large rear window of the cab. Fractions of a cab height may be used for storage boxes having a lower profile than the pickup truck profile. For purposes of this application, "bed side rail top angle" refers to an angle, in relationship to the horizontal, of the top of a bed side rail of a particular make of pickup truck. It will be appreciated that for many makes and models, this angle is zero, that is, the top of the bed rail is horizontal. However, for other models, the bed rail may be angled slightly, usually less than 25 degrees, approximately. In addition, other side rail top differences may include tops which are not flat but rather have curvature, or longitudinal races (valleys), and so on. For purposes of this application the rail top angle is any angle from 0 to 25 degrees.

Also the terms "storage box" and "tool box" are used interchangeably in the claims and specification, since a tool box is actually just a storage box for tools and or gear, and the device of the invention may be used with construction or landscaping materials, sporting goods, gear, clothing, food, car tools, etc, etc.

However the term "shipping box" refers to a box, for example of multiple layer corrugated cardboard, used for a single or at most two, shipping of the device, a first time unassembled and a second time assembled.

For purposes of this application, feet are defined to be objects mounted on an objects' bottom surface which stabilize and/or attach the object the surface upon which it rests. Thus, the feet of the present invention are dimensioned and configured to secure the body of the invention to the side rails of the pickup truck, and to hold suspended out of the bed of the pickup truck so that the bottom surface of the body of the present invention does not drop down to the top of the side rails and thus never enters the bed volume.

The feet may be elongated bodies having four surfaces, top, bottom, left and right, and in when installed, only one side (for example the right side) of a single foot may be visible sandwiched between the box and the rail.

For purposes of this application "dimensioned" will refer to different sizes (for example different sizes of feet to match different truck brands' rail tops), and "configured" will refer to shapes of an element of the dimension.

In one preferred embodiment of the invention the feet may be substantially flat areas ("footless") or apertures in the bottom of the body of the storage box, with a variety of different feet available to customize the box to a wide range of different pickup truck side rail tops. The storage box might have no feet built-in as part of the body ("footless"), with the customized feet added by a seller, re-seller or consumer based on the model of pickup truck to which the storage box is to be affixed.

Vertical clearance: note that in one preferred embodiment of the invention, the feet actually hold the bottom surface of the body of the invention sufficiently above the height of the rails (vertical clearance) so that the invention does not impede the normal usage of a tonneau cover for the bed.

The feet of the invention may fit the shape of the top of the side rails, or they may enter apertures on the side rails' top surfaces, or may engage tie downs, all of which will be considered to be dimensioned and configured to secure to the side rails. Bolts, tie-downs, latches, holds, ties, chains, cables, fasteners and the like may be parts of the feet or truck.

A channel is defined, for purposes of this invention, to be a depression having both a length and a regular width. The width of the channel across the top surface may advantageously be sufficient to allow those behind the pickup truck to see the Liddy light despite the presence of the raised toolbox of the invention. The length of the channel should be sufficient for it to extend across the top surface from front to rear, so as to avoid blocking the view of the CHMSL.

For purposes of this invention, a fairing is an aerodynamic device designed to reduce drag. In the present invention, the toolbox-to-cab fairing is designed to cover a gap which would exist between the rear side of the cab and front side of the body of the toolbox. (This gap exists because pickup truck beds are slightly separated from the rear of the cab, and of course because the feet of the invention, resting on and secured to the side rails, may require the body to be slightly removed from the cab.) Use of the fairing will prevent the formation of vortices in which air is captured and swirled into the gap behind the cap.

A hatch refers to a doorway which may be opened to retrieve tools from within the toolbox of the invention. A side-mounted hatch mounted vertically is a hatch specifically NOT opening up the top surface of the invention but instead opening up the side of the invention. Note that on conventional pickup truck mounted toolboxes, locating such doors on the side of the body would be pointless as the sides of conventional toolboxes sit inside of the volume of the bed and up against the interior sides of the side rails, and beyond being hard to reach would probably be impossible to open.

A shelf, for purposes of this invention, is removable when a user may easily detach it and slide it sideways or remove from the toolbox entirely, thus ceasing to partition an interior body volume and instead creating a single larger volume.

Note that in embodiments having bottom extensions, the shelves may be put below the level of the side rails in the extensions.

Fasteners as used herein may refer to rivets in particular, for example, pop-rivets, bolts, polymer fasteners, and so on, which pass through apertures (holes) in the edges of pieces of the storage box which are to be fastened together. The edges of the pieces of the boxes are generally referred to as a perimeter, meaning not just a single edge of a piece but to all edges thereof. Thus a four sides body such as the left side of a storage box will have four edges which together make up a perimeter.

One item of note is that the bottom ends of the box are defined to have "edges", meaning a single edge, which means the left and right corners of the storage box where the bottom surface meets the left and right end surfaces. These two edges extend the length of the storage box.

The truck box length is defined along an axis parallel with the truck axis, that is from front to rear of the truck is from front to rear of the box. The front surface of the box is normally invisible due to being very close to the cab and obscured by the fairing. The rear surface of the box is commonly visible projecting above the bed.

The foot length on the other hand may be different than the length of the box, for example, it may be from ½ to 1.0 times the length of the truck box, both measured as described above, along the same axis as the truck axis (the same dimension as used to measure the length of the vehicle.)

End of Glossary

FIG. 1 is an elevated orthogonal view of a preferred embodiment of the toolbox of the present invention. In the presently preferred embodiment and best mode presently contemplated for carrying out the invention, the first embodiment toolbox body 200 of the invention may have a brake light valley 202 entirely crossing the top surface from front to rear and thus rendering the third brake light visible behind the truck.

Side-mounted hatches 204*a* and 204*b* may be seen: 204*a* is visible on the outside, nearside, and closed. On the other hand hatch 204*b* may be seen on the far side, visible on the inner side, and partially open.

The use of side-mounted hatched immediately renders the toolbox of the invention convenient for access: the user may stand and look at approximately chest height instead of bending over and rummaging at waist height. Side access by means of the side hatches 204*a* and 204*b* furthermore allows the use of shelving. Yet further, the user does not have to lift side-mounted vertical hatches to open and close them: the weight of a conventional vertically opened hatch is surprising, and in fact some prior art devices actually use gas shocks to aid the opening.

Door latches 206*a*, 206*b* may be seen, again from front and rear sides. The latches lock, a virtual necessity, as theft rates on construction and work sites can also be rather surprising and tools are quite expensive.

Rather than a gas shock or a prop, door spring lock 208 suffices for the vertically mounted hatches 204a, 204b. The spring may be rather long and flexible and may be secured at opposite ends to the interior side of the hatch and the interior of the toolbox. In use, this type of spring may be pulled and elongated to open the hatch, but when the hatch is pushed open to the point at which the spring bends against the hatch hinge, the spring 208 may begin to act to hold the door open.

The side rails of the pickup truck bed, which define the volume thereof, allow the bottom surface of the toolbox to support the toolbox body largely outside (above) the bed volume. The bottom surface may then have bottom ends which may secure the toolbox to the siderails, or may have securing points thereon, which securing points may then support the toolbox. In some embodiments the toolbox may be entirely above the bed volume, in other embodiments it will be mostly above the bed but with bottom extensions into the bed.

Advantageously, the securing points may be feet.

Feet 210a, 210b may be seen and are instrumental in making the invention useful. It will be understood that the feet secure to the tops of the side rails and may be dimensioned and configured to various type of pickup truck hard points, which include but are not limited to tie down, apertures, posts and other devices. The feet secure to the side rails at these points, or may secure to the side rail by clamping action, or may simply be dimensioned and configured to match the contour of the top of the side rails. In general, the shape of the feet may depend upon the exact model of pickup truck involved and the exact type of securing arrangements it has.

Full sized pickup truck beds tend to be large enough to hold 4'×8' sheets of building material flat on the floor of the bed, or even several, stacked a foot high or higher. In addition, pickup truck beds come in a variety of widths. The feet may be disposed by a separation distance of the width of the bed. Thus for narrower beds, the feet will be closer to the center, while for wider beds the feet may be further apart. This may be accomplished with movable feet, by having different models of toolboxes for different pickups (one preferred embodiment) and in other ways.

Figure 9:
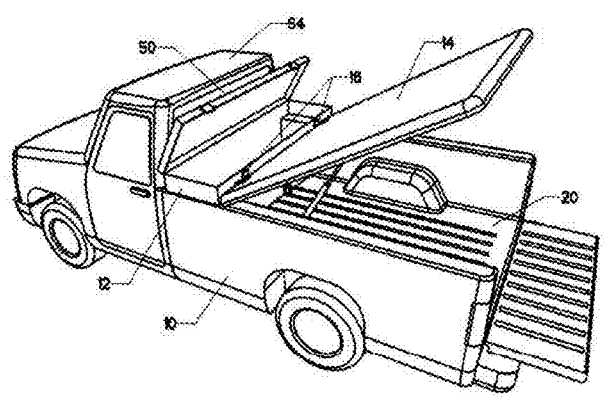
FIG. 9 is a PRIOR ART diagram showing a conventional pickup truck toolbox opening on the top and with a special tonneau cover which is shorter than the overall bed length.

Furthermore the feet 210a and 210b may provide a vertical clearance between the bottom of the box and the top of the side rails of the truck bed. This allows the use of rolling type tonneau covers without any change to the toolbox. (Note that in alternative embodiments a lifting type covers such as that shown in FIG. 9 (Prior Art) may be used with a sloped bottom surface of the tool box to allow the tonneau to swing up under the bottom of the toolbox, however, this is not the presently preferred embodiment.) Note also that in embodiments such as FIGS. 35-40 in which the bottom has extensions downward into the bed volume, this is not possible.

Rear view tunnel 212 is another safety factor. The rear view tunnel 212 allows the driver to use the rear view mirror normally, and this normal usage provides inherent safety when backing up. This furthermore allows a view of the cargo being carried in the bed. The tunnel shown is merely exemplary, the tunnel can be of any useful width and profile. The "tunnel" may but does not need to be an actual aperture through the toolbox body, it may, as shown, simply be a channel rather like a larger mirror image of the brake light valley.

Toolbox-to-cab fairing 214 may be seen to help match the edge of the toolbox 200 to the profile of a cab. Since a small gap will be normal (due to the small gap between the bed/the securing points on the side rails and the rear side of the cab) wind as the truck drives will be generated in a vortex which tries to swirl into the gap, increasing aerodynamic drag. A fairing, much like a fairing on an airplane or sports car, can prevent the swirl and the waste of energy.

Figure 2:
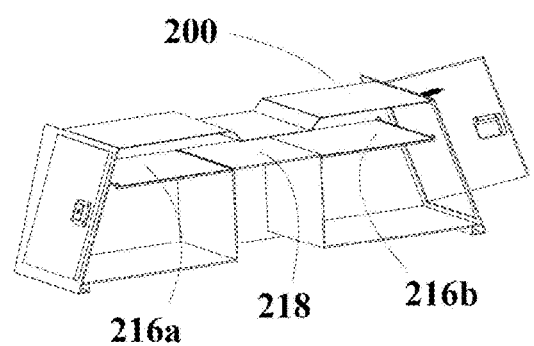
FIG. 2 is a low-elevation orthogonal view of the preferred embodiment of the toolbox of the invention with the rear side removed to show the interior, one side-mounted hatch open, and several removable shelves displayed.
Figure 3:
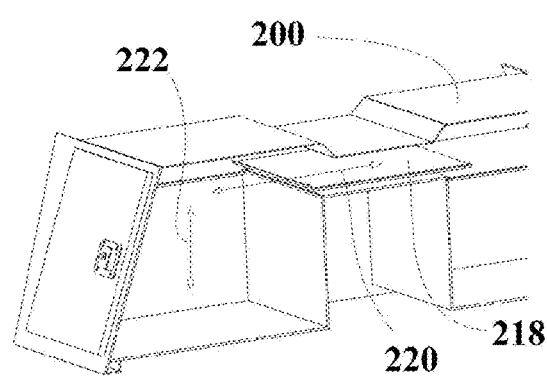
FIG. 3 is a partial low-elevation orthogonal view of the preferred embodiment of the toolbox of the invention with the rear side removed to show the interior with one removable shelf moved, creating a larger space.

FIG. 2 is a low-elevation orthogonal view of the preferred embodiment of the toolbox of the invention with the rear side removed to show the interior, one side-mounted hatch open, and several removable shelves displayed. Side shelves 216a, 216b (left and right) are on both sides of center shelf 218 and in the embodiment pictured actually combine to make a single long shelf across the entire width of the toolbox at the top. In this view both the brake light valley and the rear view mirror tunnel may be seen clearly, as well as the ability of the toolbox to allow a wide range of customizations of the interior space. Obviously additional shelves may be employed at lower or higher levels than the shelves 216a, 216b shown. In the embodiments having bottom extensions into the bed volume (see FIG. 37 for example), the shelves may even be employed below the side rail top level, that is, within the bed volume & inside the toolbox. In addition, the shelves may reduced in number or entirely removed: FIG. 3 is a partial low-elevation orthogonal view of the preferred embodiment of the toolbox of the invention with the rear side removed to show the interior with one removable shelf moved, creating a larger space. Horizontal motion of a removable shelf is depicted by arrow 220 as a user simply removes one shelf and pushed it to rest on another shelf. It may be seen that this then creates a considerably larger, unitary vertical space 222.

Figure 4:
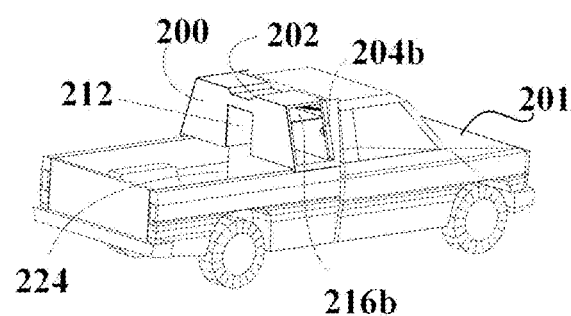
FIG. 4 is an oblique right-rear elevational view of a pickup truck having the device of the invention installed, with one side-mounted hatch open, showing the fact that the invention takes up none of the bed volume between the side walls.

FIG. 4 is an oblique right-rear elevational view of a pickup truck 201 having the device of the invention installed, with one side-mounted hatch open, showing the fact that the invention takes up none of the bed volume between the side walls. Truck bed 224 is seen to be vacant and completely available for cargo, since this embodiment does not intrude downward into the bed.

There is a trade off in terms of cargo space. While more bed volume is procured by means of the present invention, the space above the bed volume (above the side rails) is lost until the top of the toolbox is reached. However, in practical use, a pickup truck's bed volume, which is secured by side rails and the rear gate 203 (FIG. 7), is much more likely to be used on a daily basis, and is much more secure. As noted elsewhere, the ability to lay large flat sheets of building material below the toolbox is also very important.

There is a second trade off of cargo space. Embodiments which have feet that allow a tonneau cover slightly increase bed space, since the bottom of the toolbox is raised up higher than the side rails. On the other hand embodiments which project downward into the bed volume slightly reduce bed volume.

Figure 5:
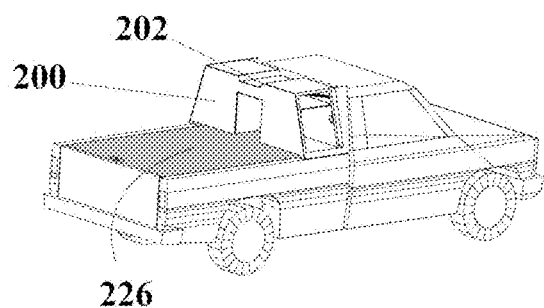
FIG. 5 an oblique right-rear elevational view of a pickup truck having the device of the invention installed, showing that a normal-sized tonneau cover may be employed with the device installed without interference.

FIG. 5 an oblique right-rear elevational view of a pickup truck having a raised embodiment of the device of the invention installed, showing that a normal-sized tonneau cover may be employed with the device installed without interference. Sliding tonneau cover 226 sits underneath the device of the invention due to the vertical clearance provided by the feet 210a, 210b (FIG. 1).

Figure 6:
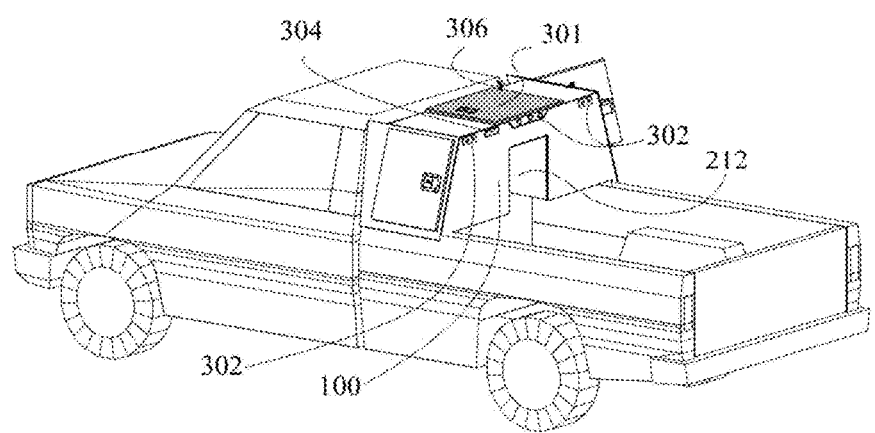
FIG. 6 is a left-rear oblique elevational perspective view of an alternative embodiment of the invention showing the space underneath available for cargo.

FIG. 6 is a left-rear oblique elevational perspective view of an alternative embodiment of the invention. Body 100 is seen in place. Cargo such as a motorcycle rear wheel (FIG. 8) might project slightly into rear view tunnel 212, if necessary, and other cargo may use the larger horizontal space under the rest of the toolbox and closer to the floor of the bed volume.

FIG. 6 also displays some optional parts which may become the preferred embodiment and best mode.

Top hatch 301 may be located anywhere on the top surface, may have a latch, and may lock. It may be used to access wiring, it may be used to access another compartment or the main compartment, it maybe hinged in various directions and may be any size from the full size of the toolbox down to quite small.

Third brake light 302 may be seen to be mounted on the toolbox, and may not be limited to a single light but can be several lights. Many modern pickup trucks have a wiring connector, for example, near the pickup truck's third brake light, which provides power to an auxiliary brake light mounted upon a camper, since campers tend to block the view of the third brake light. This camper wiring harness may be used for the toolbox of the present invention. Thus, the toolbox may have one or more auxiliary brake lights 302 which are powered by a wiring connector 306 which in turn is powered by the pickup truck's wiring connector. Thus the present invention may be mounted, plugged into the truck's pre-existing wiring connector and immediately have one or more additional third brake lights.

One potentially useful combination would be to have at least one auxiliary brake light mounted on each end of the toolbox, near the upper corners of the rear side.

Further alternative embodiments include the use of a bed illumination light 304. This light is similar to the brake lights but it would be used not while driving but to illuminate the bed at night or in the dark. This light 304 might be white, yellow, or daylight spectrum in nature rather than being brake light color (which tends to be close to red). A switch may be provided.

Figure 7:
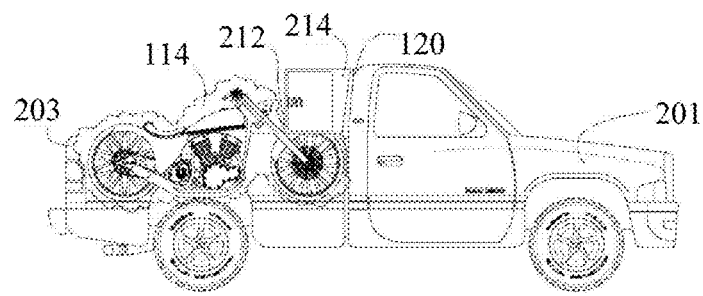
Figure 8:
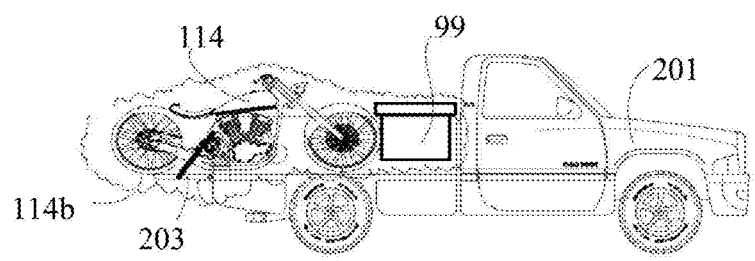
FIG. 8 is a PRIOR ART partially cut-away side view (equivalent to FIG. 7 in view) but showing the conventional toolbox and a top hatch door in use compared to the toolbox of the invention in FIG. 7.

FIG. 7 is a partially cut-away side view of an embodiment of the invention with another motorcycle for cargo, while FIG. 8 is a PRIOR ART partially cut-away side view (equivalent to FIG. 7 in view) but showing the conventional toolbox in use compared to the toolbox of the invention in FIG. 7. Conventional toolbox 99 (PRIOR ART, for example FIG. 8) sits down inside of the bed of the pickup truck, absolutely removing the forward part of the bed volume as usable space. By comparison, the box of the invention allows the use of that space and yet also allows for much easier and more efficient access to the items within the toolbox. Even embodiments of the present invention which have bottom extensions into the bed volume are superior to the FIG. 8 design since they leave considerable space below the bottom of the toolbox, while the prior art box usually reaches as far down as possible in order to maximize space within the box. The present invention need NOT reach as far down as possible, because it has a great deal of cargo space up above the level of the side rails, behind the cab.

In particular, by comparing FIG. 7 and FIG. 8 side-by-side it may be seen that the gate 203 is OPEN for the PRIOR ART in order to make space to precariously balance motorcycle rear-wheel 114b, while for the invention, the gate 203 is closed and the motorcycle rear-wheel is securely disposed inside of it.

Figure 10:
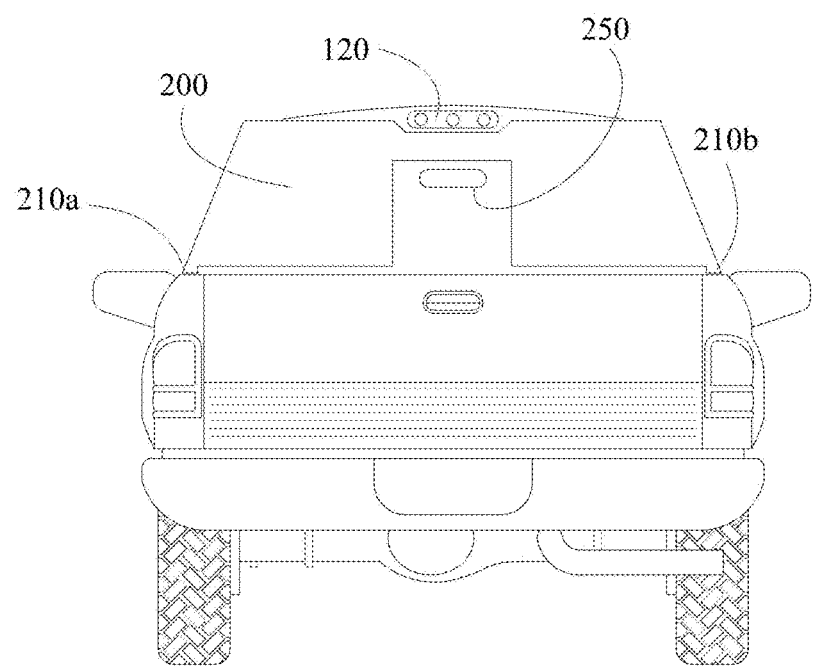
FIG. 10 is a rear view of the invention showing clearly the relationship of the tunnel, the rear-view mirror, the $3^{rd}$ brake light and the profile of the device.

FIG. 10 is a rear view of the invention showing clearly the relationship of the tunnel, the rear-view mirror, the $3^{rd}$ brake light and the profile of the device. In this embodiment of the device the body profile is still within the cab profile overall, but no longer closely follows it. Liddy light (CHSML, $3^{rd}$ brake light) 120 is plainly visible to any viewer, and the rear window of the cab is largely un-occluded. Importantly, rear view mirror 250 can be seen to have a clear field of view to the rear. Testing by the inventor has determined that proportions such as those shown in these diagrams are appropriate to provide a rear field of view from the mirror. Due to the short distance from the driver's eyes to the fairly narrow rear view mirror, the tunnel need to not be the entire width of the rear of the cab.

Figure 11:
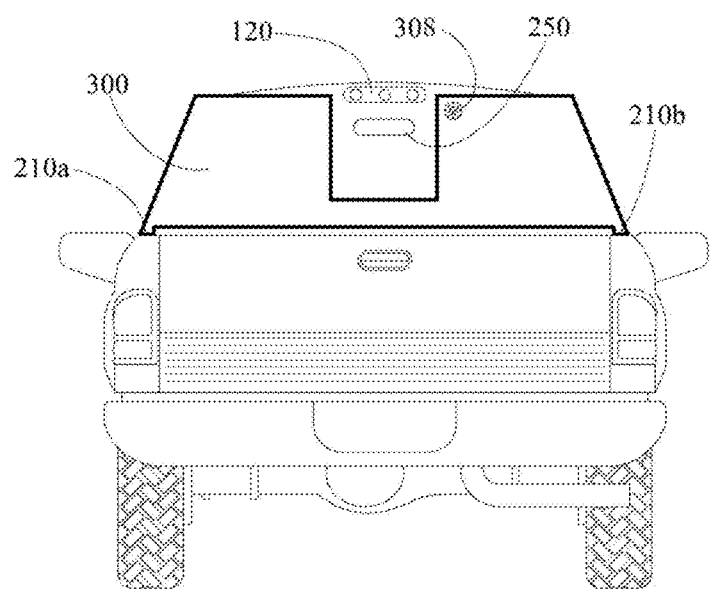
FIG. 11 is a rear view of the invention showing clearly the relationship of the a channel which is deep enough to function as the tunnel, the rear-view mirror, the $3^{rd}$ brake light and the profile of the device still substantially following the profile of the truck cab, as well as rear-view camera 308.

FIG. 11 is a rear view of the invention showing clearly the relationship of the a channel which is deep enough to function as the tunnel, the rear-view mirror, the $3^{rd}$ brake light and the profile of the device still substantially following the profile of the truck cab. Body 300 has in this embodiment a channel which is deep enough to allow rear view mirror 250 to be employed: the tunnel is inverted, comprising a deepening of the channel.

FIG. 11 also shows the camera 308. Rear view camera 308 may have a display (not shown) mounted in the cab of the truck, or may be used wirelessly, by network etc. The rear view camera 308 may have a field of view substantially similar to the field of view of the rear view mirror 250.

Modern pickup trucks often have back up cameras installed, and the use of "all around view" cameras is becoming popular on various models of vehicles. As these cameras become more prevalent, the concern users may feel about partially occluding the rear window will continue to dissipate.

Figure 12:
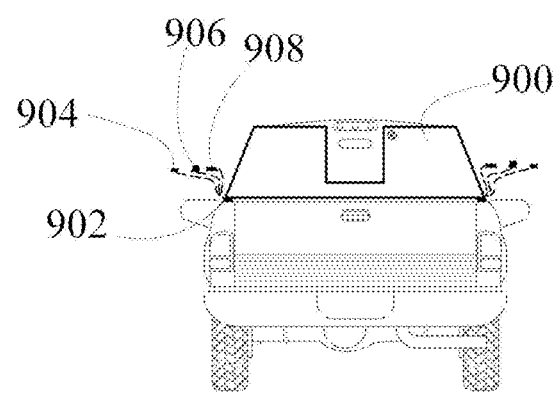
FIG. 12 is a rear view of the preferred embodiment of the invention showing a footless embodiment of the invention with interchangeable feet for different types of pickup truck.

FIG. 12 is a rear view of the invention showing a footless embodiment of the invention with interchangeable feet for different types of pickup truck. In this embodiment body 900 has no feet, however, a set of interchangeable feet, or adapters 902, are mounted under the body and atop the side rail, and connect the body to the side rail. This particular truck is a DODGE® model and so adapter feet 902 are dimensioned and configured to this particular make/model. Feet 904 on the other hand may be mounted in place of feet 902 so that the body 900 may be mounted to a different make or model. The same applies to feet adapter sets 906 and 908. For example, feet 904 might adapt to a standard size of GM® truck, while 906 and 908 might allow the storage/tool box to match to two different sizes of FORD® pickup trucks, and one set of feet might be generic to a family of trucks or several families of trucks.

In addition, different tonneau covers project different amounts above the top of the bed rails, and/or may project different distances to the side, so different feet in interchangeable sets may accommodate different tonneau covers as well as different models of truck.

Figure 13:
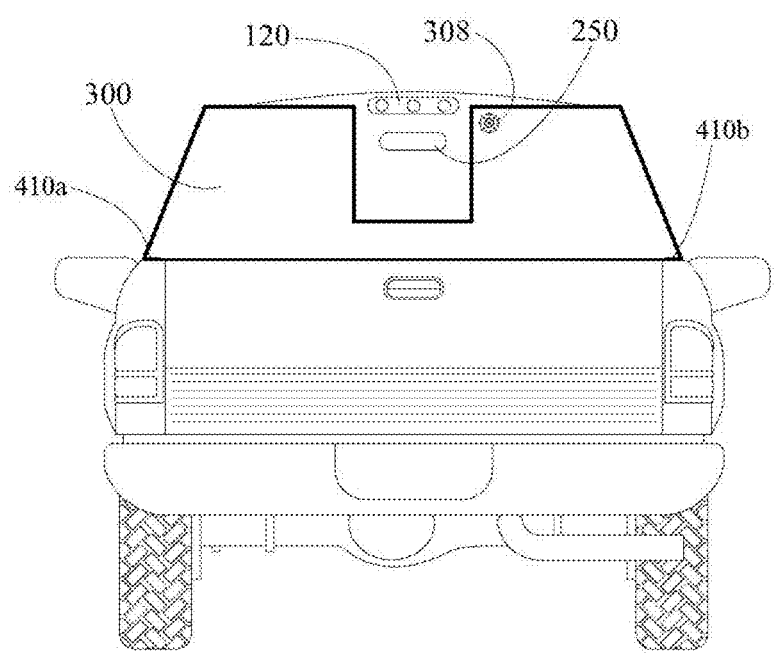
FIG. 13 is a rear view of the invention showing clearly the relationship of the tunnel interrupting the top surface, the rear-view mirror, the $3^{rd}$ brake light, profile, rear-view camera 308 and the lack of feet on this embodiment.
Figure 14:
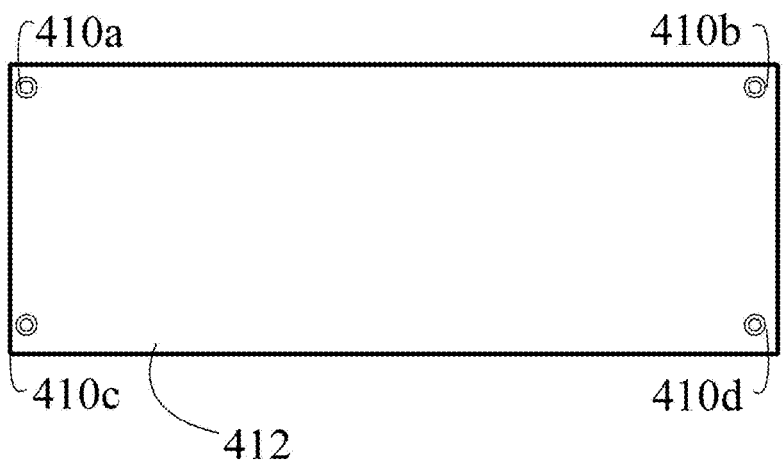
FIG. 14 is a bottom view of the invention in an embodiment having no bottom side tunnel.

FIG. 13 is a rear view of the invention showing clearly the relationship of the tunnel interrupting the top surface, the rear-view mirror 250, the $3^{rd}$ brake light, profile, and the lack of feet on this embodiment. The body 300 has a bottom surface which is fixed on the rail tops as shown by 410a, 410b. The unbroken bottom surface 412 is not visible in this diagram, being edge on. However, the rear view camera 308, the CHMSL 120, and other parts of the invention and the truck to which it is mounted may be seen. FIG. 14 is a bottom view of the invention in this embodiment having no bottom side tunnel. Box bottom surface 412 is unbroken from side to side for the width of the truck bed, and is fixed onto the rail tops by feet/securing points 410a, 410b, 410c, 410d. These may be as simple as apertures or may be more complex, as shown: threaded apertures, apertures with locking devices or collars/studs/pins, apertures which may be grommeted, and so on and so forth.

Legs or mounts may be used to then attach the storage box to the rails at the truck's mounting points, which are usually rather square holes in the top of the rails. These legs or mounts may be interchangeable, allowing one box to sit on more than one type/make/model of pickup truck.

Figure 15:
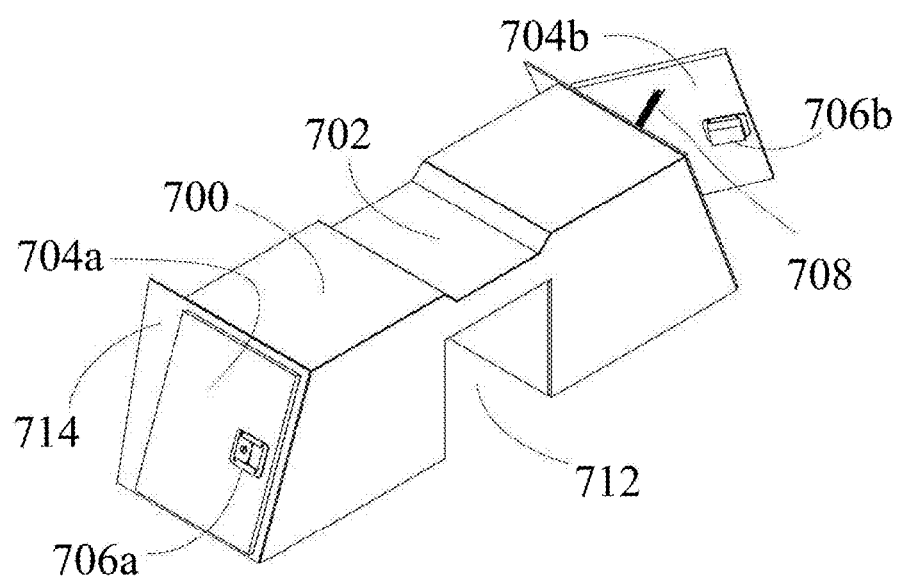
FIG. 15 is an elevated orthogonal view of a preferred embodiment of the toolbox of the present invention having no feet.

FIG. 15 is an elevated orthogonal view of a preferred embodiment of the toolbox of the present invention having no feet. Body 700 may have the brake light visibility feature 702, side-mounted hatches 704a, 704b, door latches 706a, 706b, door spring locks 708 and so on which may optionally be similar to the arrangements described earlier, for example, the advantageous mounting of the doors using vertical hinges so as to open horizontally (and be blown closed again by the slipstream if they happen to come unlatched while the truck is in motion.)

Rear view tunnel 712 may be seen in this embodiment to be a tunnel from the bottom surface of the device and interrupting that bottom surface to define two separate parts to the bottom surface, as shown in other diagrams. In embodiments with bottom extensions, the bottom surface may be more than two separate parts, depending on the number of steps in the bottom surface. This tunnel may thus rise from the "bed height" (that is, the top of the rails as previously defined in the Glossary) to something a bit less than the "cab height" which is also the top of the storage box in embodiments in which it follows the profile of the truck cab.

Storage box-to-cab fairing 714 may provide a more aerodynamic and fuel efficient shape, again as discussed previously.

Figure 16:
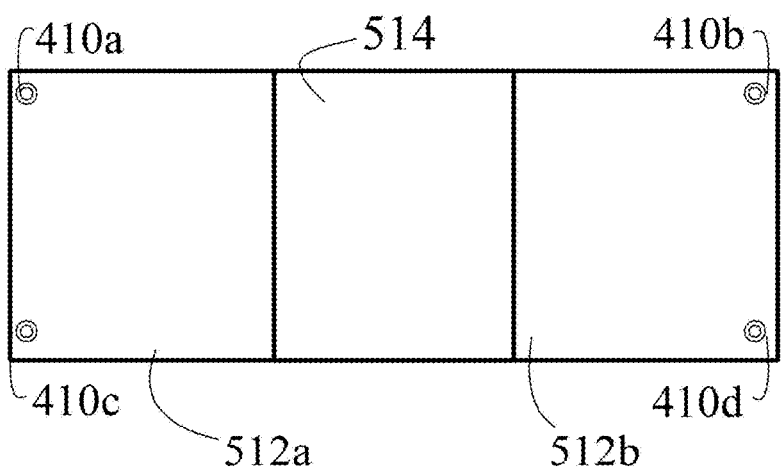
FIG. 16 is a bottom view of the invention in an embodiment having a bottom side tunnel.

FIG. 16 is a bottom view of the invention in an embodiment having a bottom side tunnel. Box bottom surface fixed on rail top (at mounting spots 410a, 410b, 410c, 410d) is interrupted by the tunnel and thus is actually two bottom surfaces (designated first & second, 512a 512b). The tunnel has an elevated bottom surface (really the ceiling of the tunnel or the bottom of the box body at that point) 514 which is higher up than bottom surfaces 512a/512b.

Figure 17:
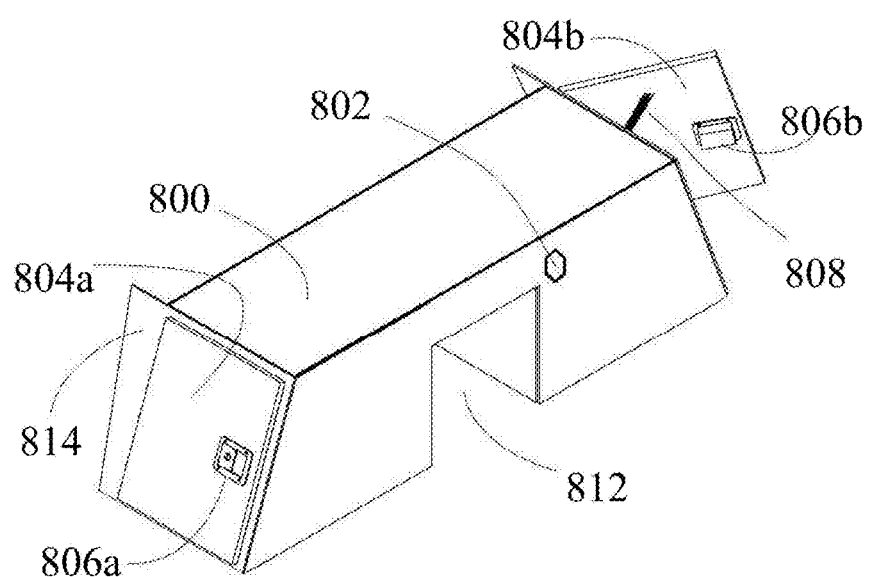
FIG. 17 is an elevated orthogonal view of a preferred embodiment of the toolbox of the present invention having no feet and no top-side channel.

FIG. 17 is an elevated orthogonal view of a preferred embodiment of the toolbox of the present invention having no feet and no top-side channel.

Body 800 once again a rear view tunnel 812, side-mounted hatches 804a, 804b, door latches 806a, 806b, door spring lock 808 (which again, is designed to shut the door if it comes open, and as a convenience for the user to shut the door), CHSML/Rear view cam/bed light combined 802, and the storage-box-to-cab fairing 814. Note that the combination of the two lights and the camera is optional only, for example, for aesthetic purposes, or to require only a single protective housing, etc etc.

Figure 18:
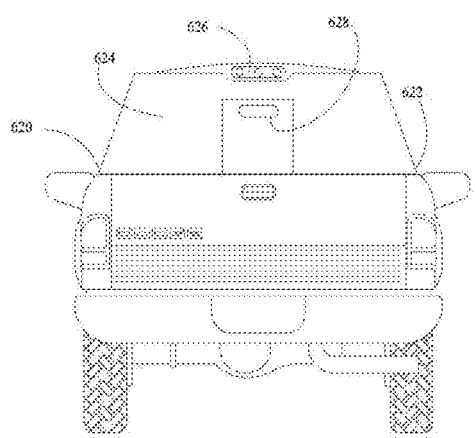
FIG. 18 is a rear view of the invention showing clearly the relationship of the tunnel interrupting the bottom surface, the rear-view mirror, the $3^{rd}$ brake light, profile, and the lack of feet on this embodiment.

FIG. 18 is a rear view of the invention showing clearly the relationship of the tunnel interrupting the bottom surface, the rear-view mirror, the $3^{rd}$ brake light, profile, and the lack of feet on this embodiment. Box bottom surface ends 620, 622 support the body 624 of the box on the side rails of the bed, with the truck CHSML 626 and the truck rear view mirror 628 plainly visible and usable.

Figure 19:
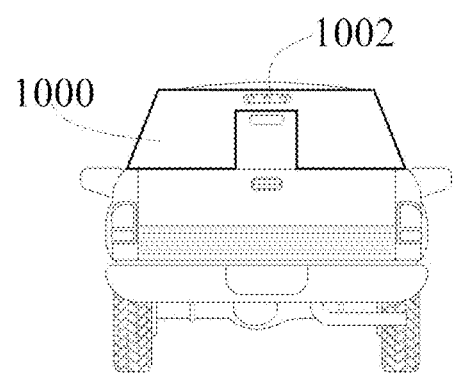
FIG. 19 is a rear view of the invention with an alternative Liddy light.

FIG. 19 is a rear view of the invention with an alternative CHSML light. Body 1000 has a different type of accessory housing 1002 which may house a brake light, bed light, camera, etc.

Figure 20:
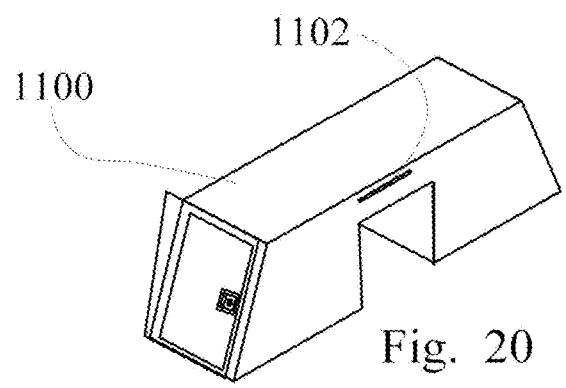
FIG. 20 is an elevated orthogonal view of an embodiment having an LED light.
Figure 21:
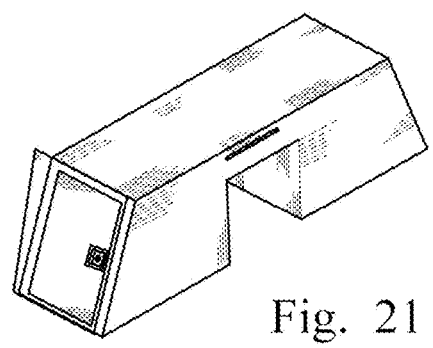
FIG. 21 is an elevated orthogonal view of an embodiment having an LED light as well.

FIG. 20 is an elevated orthogonal view of an embodiment having an LED light mounted on body 1100. The use of LED light 1102 may allow a battery operated, radio controlled, brake light, such as is often used on trailers. This allows use on trucks having no external brake wiring. FIG. 21 is another elevated orthogonal view of the embodiment having an LED light as well.

Figure 22:
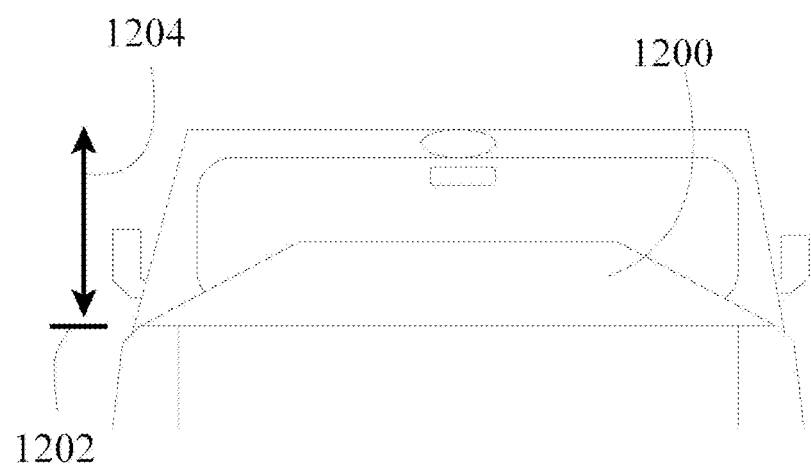
FIG. 22 is a rear view showing a lower height storage box according to the invention, and showing the "cab height".

FIG. 22 is a rear view showing a lower height storage box according to the invention, and showing the "cab height" and the "bed side rail height". Half height body 1200 is not exactly one half the height of the cab but rather a fraction of the height of the cab, and this cab height is not measured from the ground but rather from the bed height. Bed side rail height 1202 may be seen marked at the level of the top of the side rails, not the level of the bottom of the side rails. Cab height 1204 is thus measured from bed side rail height (top of the side rails) to the top of the cab. This is the useful height for the storage box of the invention when it is desirable to minimize drag by matching the height and profile of the cab.

Figure 23:
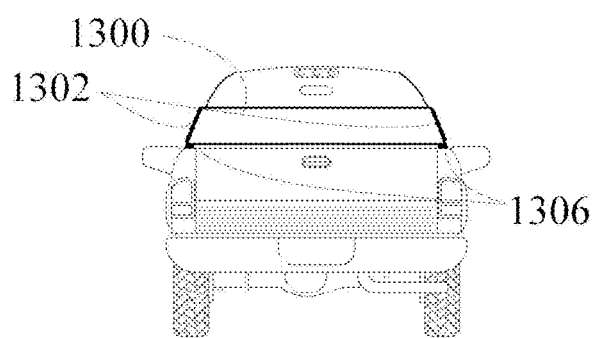
FIG. 23 is a rear view showing a lower height storage box according to the invention, in an actual embodiment having a set of side doors and feet.

FIG. 23 is a rear perspective view showing a lower height storage box according to the invention, in an actual embodiment having a set of side doors and feet. Body 1300 has side doors 1302 which match the general shape of the left and right ends of the device. The tool box/storage box of the invention generally matches the profile of the cab (due to perspective, it appears to bulge a bit on each side) but only up to the height of the box, then it simply is lower than the overall cab height (defined previously and depicted in FIG. 22).

Feet 1306 may be seen as with previous embodiments: these feet allow the use of a rolling tonneau cover.

Figure 24:
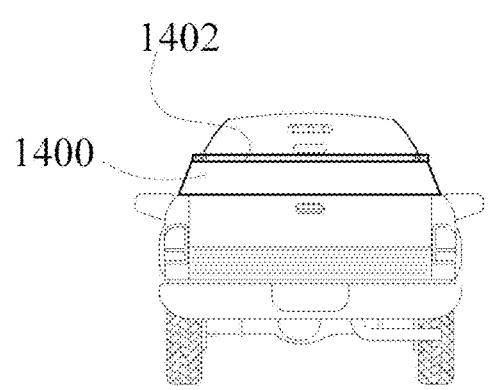
FIG. 24 is a rear view showing a lower height storage box according to the invention in an actual embodiment having a different door arrangement.

FIG. 24 is a rear view showing a lower height storage box according to the invention in an actual embodiment having a different door arrangement. Body 1400 has top door 1402. This embodiment lacks feet, making it less expensive to produce but disallowing the use of a full-size tonneau cover.

Note that the embodiment of FIG. 23 and the embodiment of FIG. 24 are different heights as measured from the bed side rail height. There is no requirement that the embodiments be exactly ½ of the cab height, or any other particular height, as long as they are a low fraction of the total height of the cab.

Figure 25:
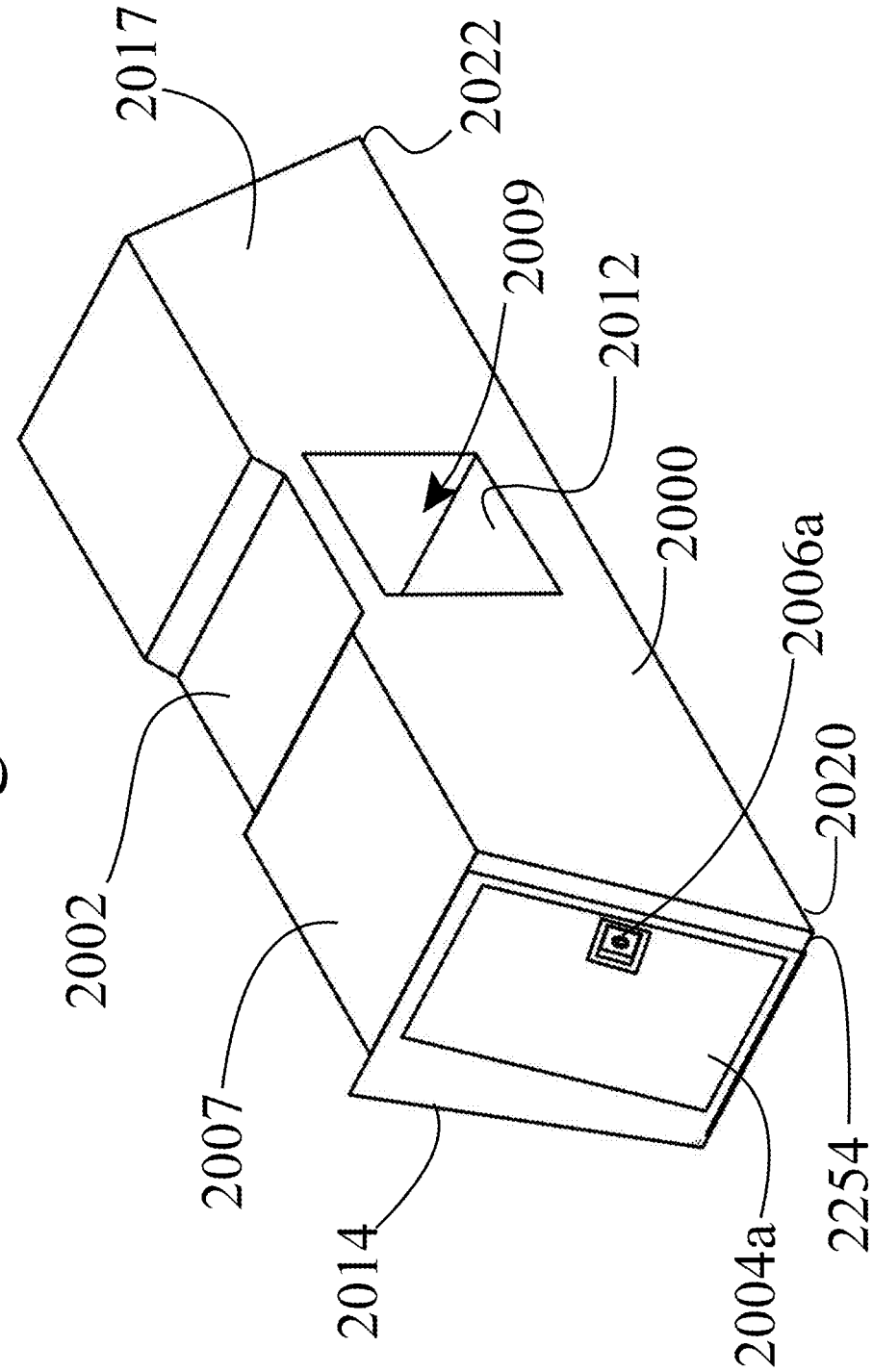
FIG. 25 is an elevated orthogonal view of an embodiment having a tunnel through the box.

FIG. 25 is an elevated orthogonal view of an embodiment having a tunnel through the box. Box 2000 has a third brake light visibility feature 2002, which may be dimensioned to match the rear brake light of a particular model of truck. For example, if the third brake light is 12 inches long and three inches deep, the visibility valley 2002 may be slightly more than 12 inches wide and slightly more than three inches deep.

Hatch 2004a has latch 2006a and is part of a left side 2014 of the box 2000. Top surface 2007 may be seen to be the complement to the bottom surface discussed previously, just as the front wall (not seen here) is a complement to the visible rear wall 2017.

Tunnel 2009 may be seen to pass through the box body without interrupting either the top surface 2007 or the bottom surface. In this embodiment tunnel 2009 is comprised of two apertures, one through the front wall and one through the rear wall. The apertures are square in shape and thus tunnel 2009 has a square cross section and therefore has four tunnel walls 2012, a top tunnel wall, a bottom tunnel wall, and left and right tunnel walls. These tunnel walls maybe made of the same material as the box body and thus may have the same thickness.

It will be appreciated that the tunnel still functions as an effective means of viewing objects in the rear-view mirror. Note that the tunnel may be of different widths, sizes and shapes at the front wall and the rear wall. For example, it might be larger at the rear wall 2017 due to the fact that the rear wall is further from the mirror and thus needs a greater width in order to subtend the same visual arc.

Box surface bottom ends 2020, 2022 may in this embodiment sit directly onto the siderail tops.

Figure 26:
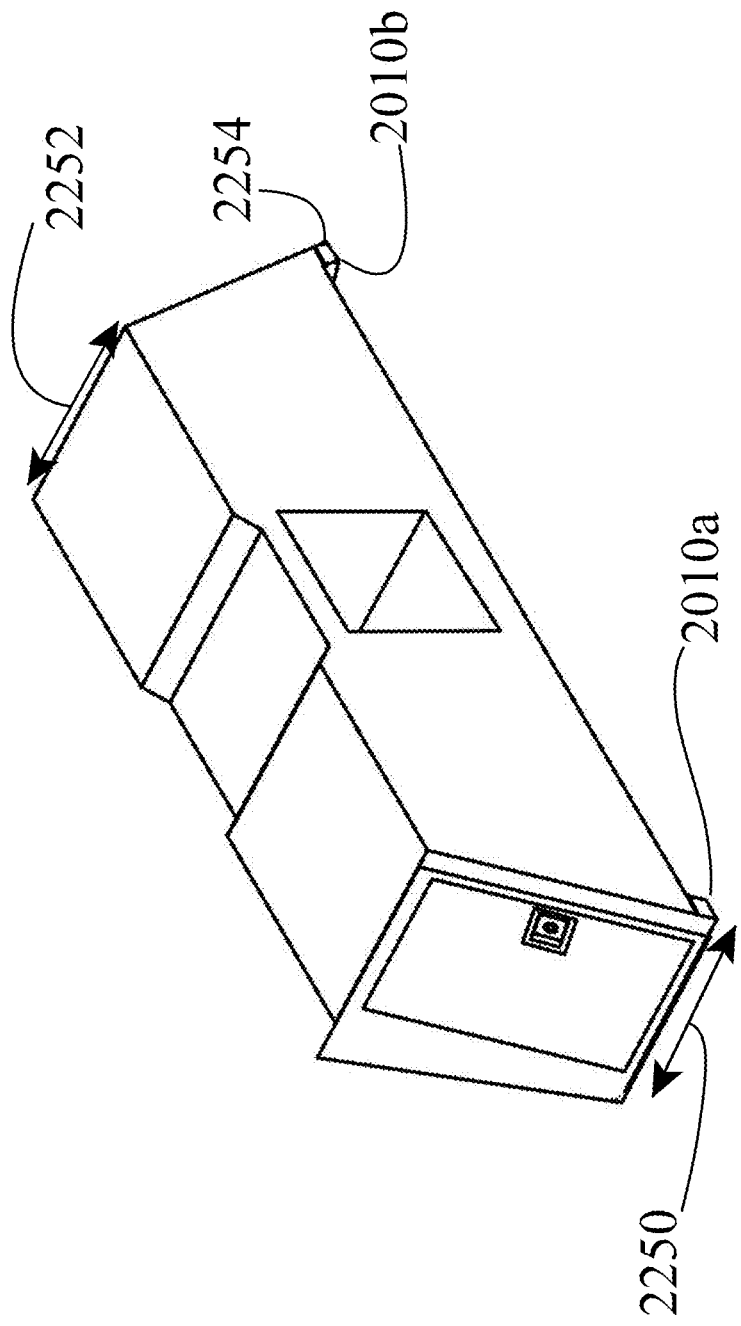
FIG. 26 is an elevated orthogonal view of an embodiment having a tunnel therethrough, and feet.

FIG. 26 is an elevated orthogonal view of an embodiment having a tunnel therethrough, and feet. Feet 2010a, 2010b are attached to the box surface bottom ends 2020, 2022 on the top of the feet, and attached to the side rail tops on the bottom of the feet.

Edge 2254 is seen. This is, as defined in the glossary above, the edge where the bottom surface (not seen here) meets the left side, forming a corner or edge which runs along the box. This is not exactly a 90 degree angle, due to the desire to make the box match the profile of the pickup truck cab and most pickup trucks in recent decades have slight "tumble home" to the side walls of the cab. Note that this edge 2254 is not truly a perimeter either, both because it is a single straight line and also because it is a three dimensional body rather than a two dimensional perimeter.

Foot length 2050 may be seen to relate to the box length 2052. While a plurality of feet may be utilized, in the presently preferred embodiment, there is only a single foot on each end, extending longitudinally for a significant fraction of the box length, on the bottom surface at the edge as previously defined: box bottom end edge 2054.

Figure 27:
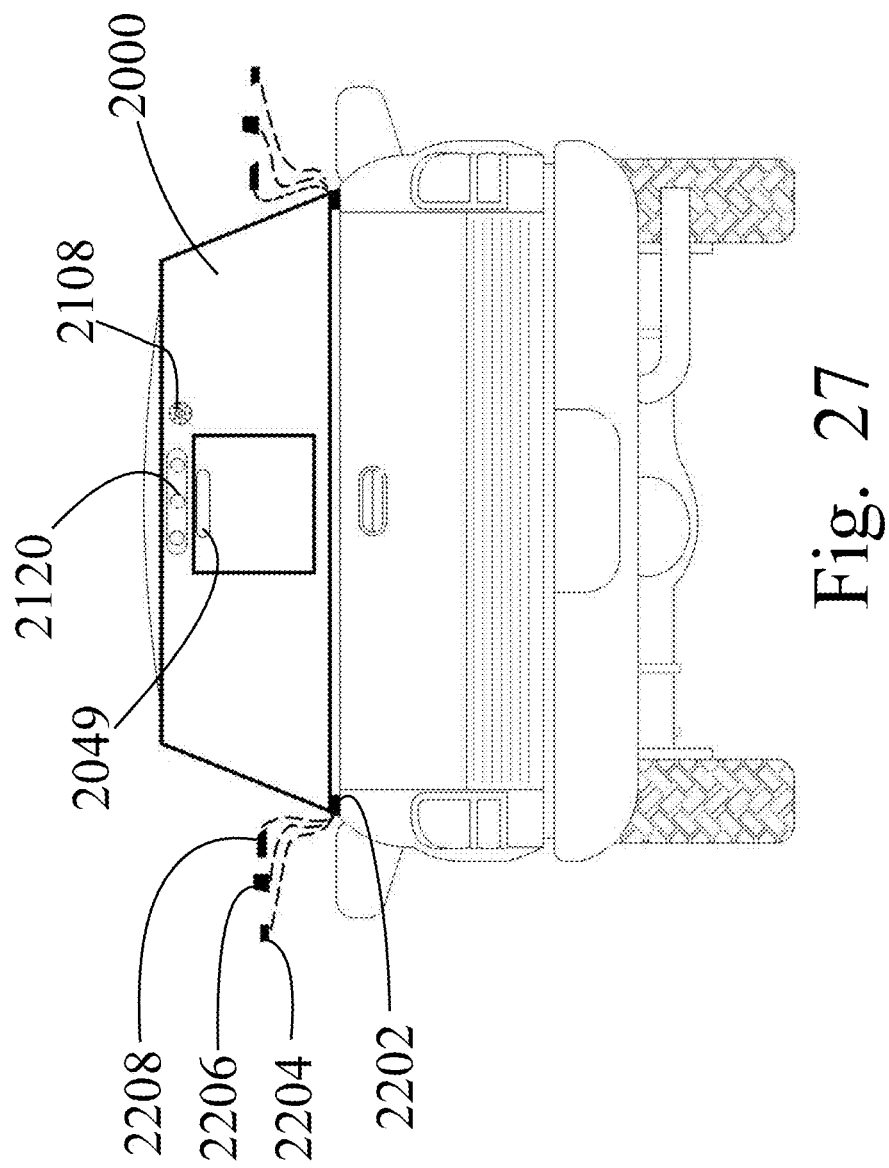
FIG. 27 is a rear view showing a tunnel embodiment of the invention mounted, with different sets of interchangeable or customizable feet.

FIG. 27 is a rear view showing a tunnel embodiment of the invention mounted, with different sets of interchangeable or customizable feet. Rear view mirror 2049 may be seen to be usable via the tunnel. Bed light 2108 (which is much as discussed previously: it may include a camera, external switch, power coupling, etc), and brake light feature 2120 are visible.

Figure 32A:
FIGS. 32a, 32b, and 32c are three end views of different foot configuration, provided in order to show the subtle contour differences in feet for different brands of trucks.

Interchangeable feet 2202, 2204, 2206, 2208 are also visible and discussed in much greater detail in reference to FIGS. 31, 32*a,b,c* and 33*a,b,c*. It will be understood that the individual box may be customized before sale, or the user may purchase the box with multiple sets of feet, or as accessories or retrofits.

Figure 28:
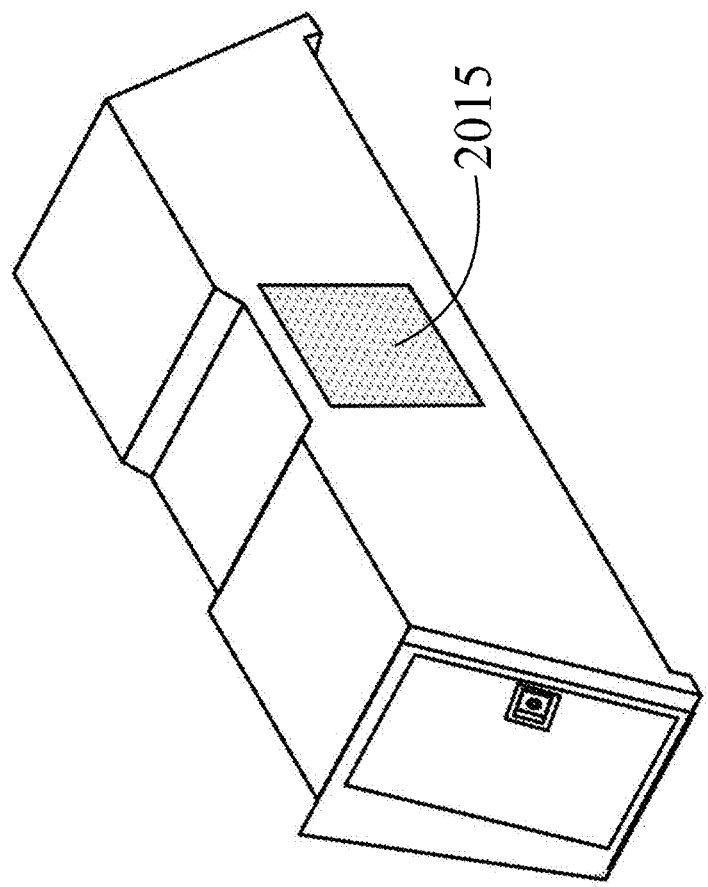
FIG. 28 is an elevated orthogonal view of an embodiment having a windowed tunnel therethrough, this embodiment designed to save manufacturing costs as the tunnel need not be constructed with walls, thus allowing the entire interior of the toolbox to be a single large space if desired.

FIG. 28 is an elevated orthogonal view of an embodiment having a windowed tunnel therethrough, this embodiment designed to save manufacturing costs as the tunnel need not be constructed with walls, thus allowing the entire interior of the toolbox to be a single large space if desired. This creation of a single large space inside the box is greatly advantageous for tool storage reasons, however, it will be appreciated that tools might slide into the space between the windows and thus partially or wholly block rear views. Thus this embodiment is not necessarily presently preferred despite its convenience and relatively inexpensive construction.

Aperture window 2015 may be made of a polymer or a hardened "glass" (which usually also contain polymer components). The window 2015 may also be removable with hand tools allowing easy replacement if the window becomes scuffed or damaged.

It may be seen that this embodiment has a "tunnel" which is really two apertures, one each in the front wall and rear wall, possibly without tunnel walls.

Figure 29:
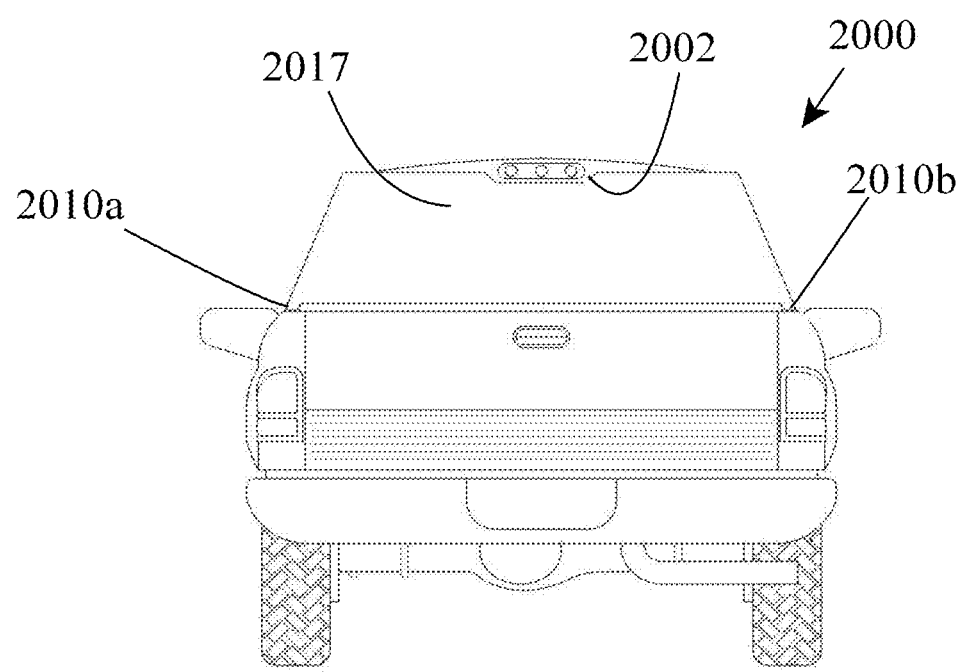
FIG. 29 is a rear view showing an embodiment with only feet.

FIG. 29 is a rear view showing an embodiment with only feet. This embodiment allows use of a tonneau cover but prevents usage of the rear-view mirror. The feet may of course be interchangeable as discussed previously, for example in regard to FIG. 27.

FIG. 30 is an elevated orthogonal view of an embodiment having only feet, but showing details of construction suitable for easier shipment, as will be discussed further below.

Fastener hole 2262 is located along the perimeter of the rear wall, perimeter 2260. This perimeter is not a single edge but a series of edges, four to six depending on how it is counted. The perimeter need not be continuous. Most fastener holes in the various perimeters of the various parts (the left and right sides, the top surface, bottom surface, front all and rear wall all have perimeters of course) are depicted with fasteners 2264, 2266 already in place. Fasteners, as previously defined in the glossary, may specifically include rivets of a type easy to install with smaller tools, or may be bolts, etc.

FIG. 31*a* is a rear view of a pickup truck with the invention mounted, including a detail call-out view FIG. 31*b* showing how a pickup truck side rail may in some brands of truck be angled, thus necessitating angled feet.

Truck 2301 has box 2300 thereon. Foot 2310*a* is seen end on, sandwiched between the box 2300 and the rail top 2305, with the top surface of the foot attached to the box and the bottom surface of the foot attached to the bed rail top, and with the right surface of the foot largely invisible under the box but the left surface of the foot visible on outside inspection of the left end of the box. The foot may from the left side appear very much like part of the box.

Before passing this diagram it is important to examine the match of the shape of the foot, seen end on, with the angle of the bed rail top. The bed rail top is just slightly angled and the foot matches that.

In some prior accessories to truck beds, it has been known to NOT match the angle of some fitting to the angle of the bed rail, resulting in the weight of the accessory resting on a single line of the bed rail, which in turn may result in wear, rust, creasing and even buckling of the bed rail top.

Figures 33A, 33B, 33C:
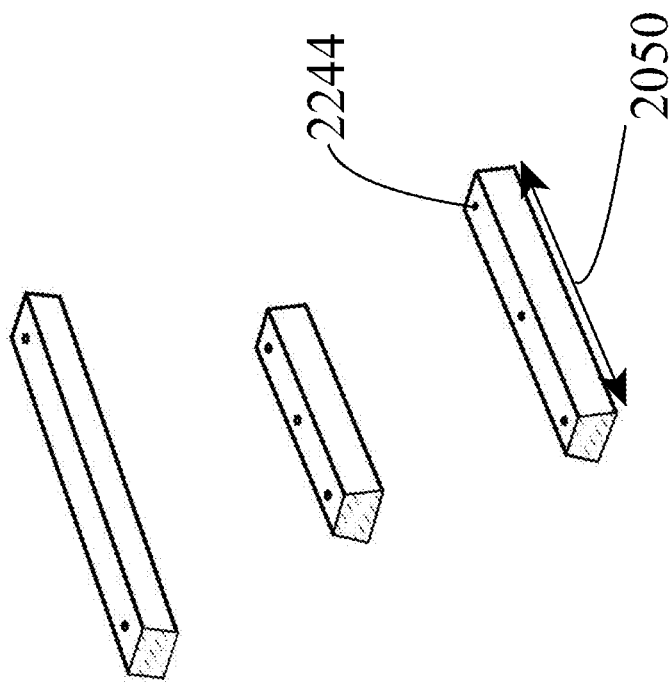
FIGS. 33a, 33b, and 33c are three elevated orthogonal view of feet shown in three dimensions so as to clarify the nature of the feet, which are long members spanning a fraction of the width of the toolbox. In this view it is harder to see the contour differences but more plain what the feet look like in reality.

FIGS. 32*a,b*, and *c* are three end views of different foot configuration, provided in order to show the subtle contour differences in feet for different brands of trucks. FIGS. 33*a,b*, and *c* on the other hand are three elevated orthogonal views of feet shown in three dimensions so as to clarify the nature of the feet, which are long members spanning a fraction of the width of the toolbox: in this view it is harder to see the contour differences but more plain what the feet look like in reality.

Top surface of foot 2336 (FIG. 32*c*) and matching bottom surface of foot 2338, as described attach respectively to the box and the bed rail top. The left side of foot 2340 would be visible on this foot from the left side of the vehicle, unlike the right side of foot 2342. Note that a matching mirror image foot is required for the right end of the bottom surface of the box, used on the right side of the vehicle. This particular shape shown in FIG. 32*c* can actually be reversed, so that the mirror image right foot is actually just a left foot, turned 180 degrees.

FIG. 32*a* shows a very simple foot which would actually find wide usage: many trucks have flat tops to the bed rails, and the loss of aerodynamic efficiency and esthetic appeal is trivial.

Figure 32B:
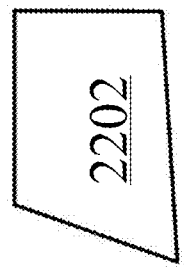
Figure 32C:
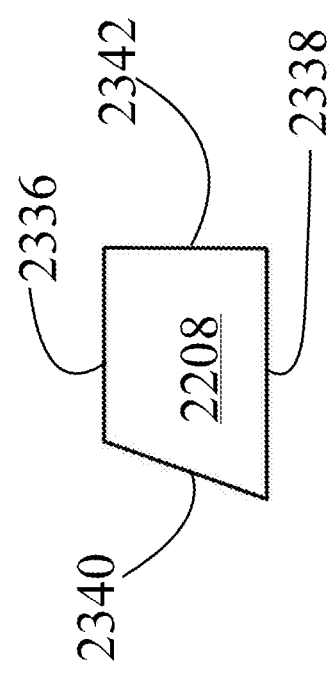

FIG. 32*b* shows a custom foot, one that has a non-zero angle on the bottom 2338 to match a particular model of truck bed, such as shown in FIG. 31.

From this discussion it may be seen that the foot may be a hollow tubular stock of customized shape and cross-section or the like.

FIGS. 33*a,b*, and *c* however, show these same feet cross-sections but in orthogonal view at a different scale, thus making it hard to see the bottom angle. It may be seen that length 2050 need not be the same: not only can the truck box length vary from model to model (for example a box having less length for a short bed truck), but also to allow space for other accessories fitting between the box and bed rail tops. In general, foot lengths from ½ to more than 1.0 times the length of the box are desired.

Figure 34:
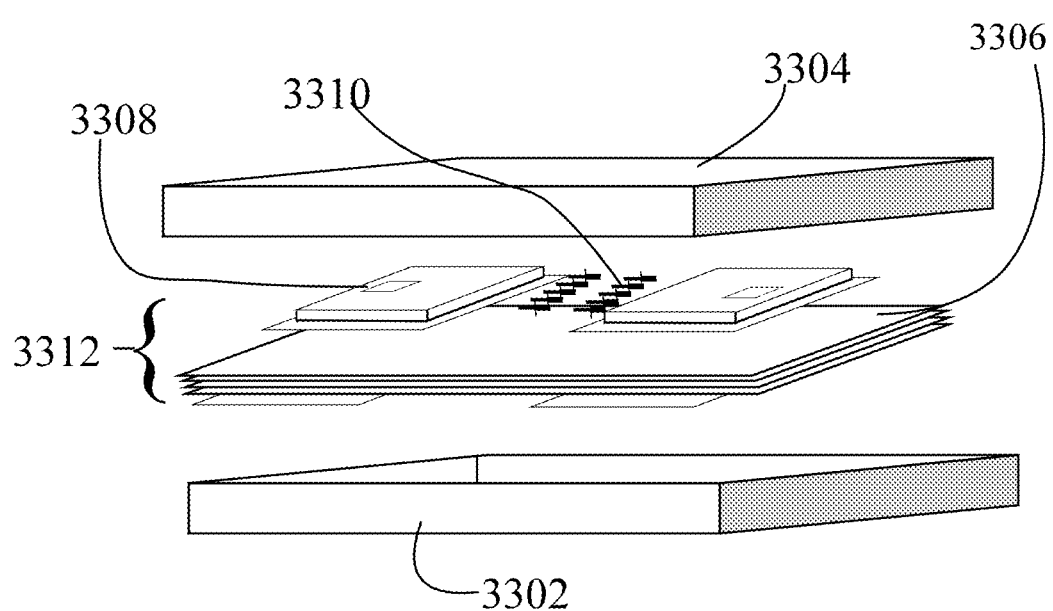
FIG. 34 is an exploded view of a flat pack with the sides removed to reveal the parts within.

Shipping of truck storage boxes presents a challenge. They cannot be nested, the surface finish needs protection and the size is inconveniently slightly larger than a single person can handle alone. FIG. 34 shows a flat pack with the sides removed to reveal the parts within. This method has been created to handle these problems. In general the box is manufactured at a central facility, including powder coating, painting, enamel, etc. Fasteners and so on are provided. Then the box is stacked as pieces, making a surprisingly flat package.

The combination of the truck box, disassembled and laid flat, and the shipping box, are believed to be unique. Shipping box bottom 3302 and shipping box top 3304 are shallow trays, open on one side, which nest over the truck box in it's flattened condition before final assembly.

The stack 3312 of box components is shown slightly angled and slightly exploded for clarity. Front wall 3306 is shown atop the stack in this example, with the other large sections (rear wall, top and bottom) below it, but the order is not necessarily this. For example in embodiments having a valley on the top surface, the top surface may advantageously be the top item in the stack of four large walls.

Hatch 3308, already in place in the left side, is shown taking up only part of the next layer of stack 3312, with the fasteners 3310 (rows of rivet gun rivets in this case but any arrangement which fits into the space between the hatches is adequate) located between the two hatches. Other parts, instructions and so on may be included.

Figure 35:
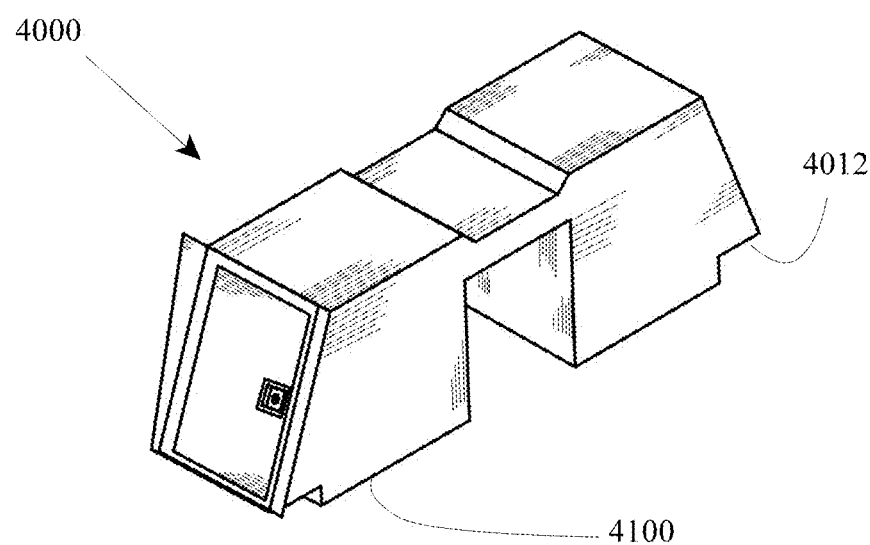
FIG. 35 is an elevated orthogonal view of a toolbox according to the present invention which would in use project slightly downward into the bed volume.

FIG. 35 is an elevated orthogonal view of a toolbox according to the present invention which would in use project slightly downward into the bed volume.

Toolbox 4000 has two footless bottoms 4012. In use these will be put onto the siderails of the pickup truck, while the body of the box is substantially behind the cab and above the bed of the pickup truck.

Downward extension 4100 however, provides a modest improvement in storage space within the box without substantially reducing the volume of the pickup bed. As may be seen this downward bottom extension 4100 may be only an inch or two, yet it does provide storage space for slightly larger items, slightly larger items and so on.

Figure 36:
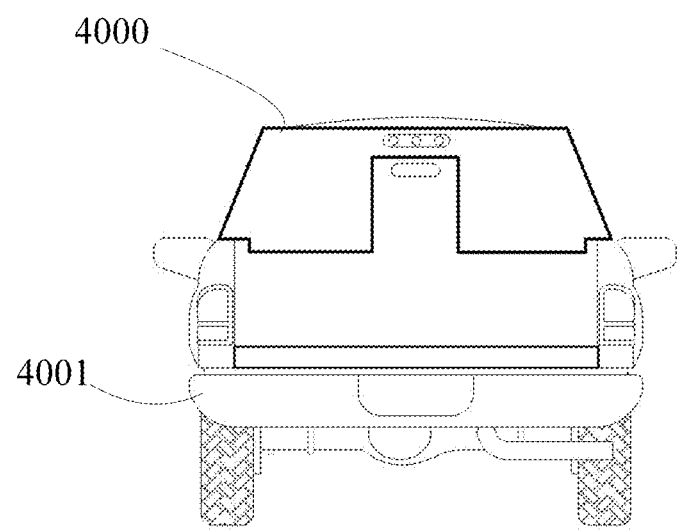
FIG. 36 is a rear view of a pickup truck with the invention mounted thereupon, showing exactly how the toolbox projects slightly downward into the bed volume.

FIG. 36 is a rear view of a pickup truck with the invention mounted thereupon, showing exactly how the toolbox projects slightly downward into the bed volume.

Toolbox 4000 sits atop the side rails of pickup 4001.

Note that downward extension 4100 (and the matching extension on the other side) do prevent the device from being used with a tonneau cover such as was discussed previously. Thus users who need a tonneau cover will need to avoid this embodiment, while users who need extra storage space will prefer this embodiment.

Figure 37:
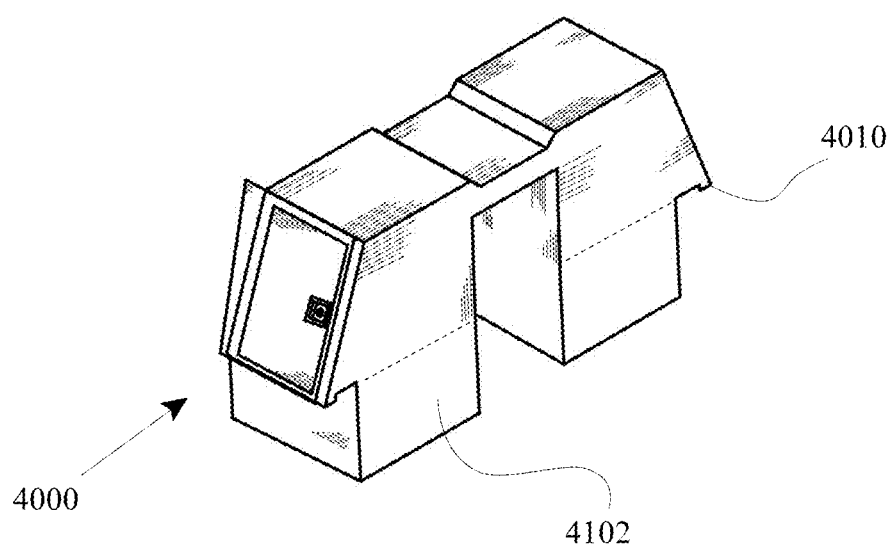
FIG. 37 is an elevated orthogonal view of a footed toolbox according to the present invention which would in use project downward into the bed volume.

FIG. 37 is an elevated orthogonal view of a toolbox according to the present invention which would in use project downward into the bed volume, in an embodiment which is not only deeper but also includes feet as discussed previously, for example in reference to FIG. 32.

However, unlike prior references which show feet reaching to the floor of the bed of the pickup truck, the invention shows the feet will match the side rails and the feet do not add to the space taken up within the bed.

Toolbox 4000 has the feet 4010 NOT on the deeper extension 4102 but rather on the ends of the toolbox body. In addition, as discussed and shown previously (for example FIGS. 31, 33, etc) these feet may be suited to the exact model of pickup truck which the box is used with. In fact, a user who likes their box, but buys a new pickup truck, may remove the feet used with their old vehicle, apply the feet appropriate to the new truck, and move the toolbox to the new truck.

Figure 38:
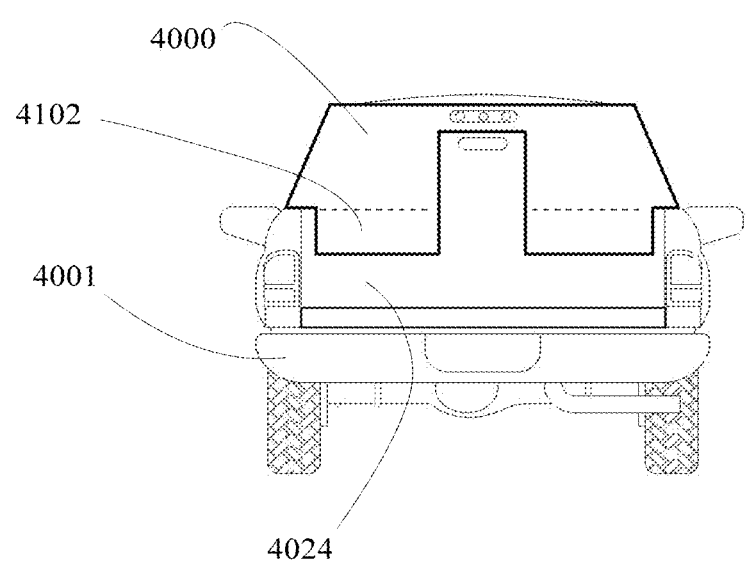
FIG. 38 is a rear view of a pickup truck with the invention mounted thereupon, showing exactly how the toolbox projects downward into the bed volume.

FIG. 38 is a rear view of a pickup truck with the invention mounted thereupon, showing exactly how the toolbox projects downward into the bed volume. Toolbox 4000 on pickup 4001 projects downward (at the bottom extensions 4102) well into the truck bed volume 4024. These extensions are noticeably deeper than in the embodiment of FIG. 35 or 36.

Notice that this embodiment of FIG. 38 is not the same as the embodiment of FIG. 37: although it is deeper, it lacks feet.

Figure 39:
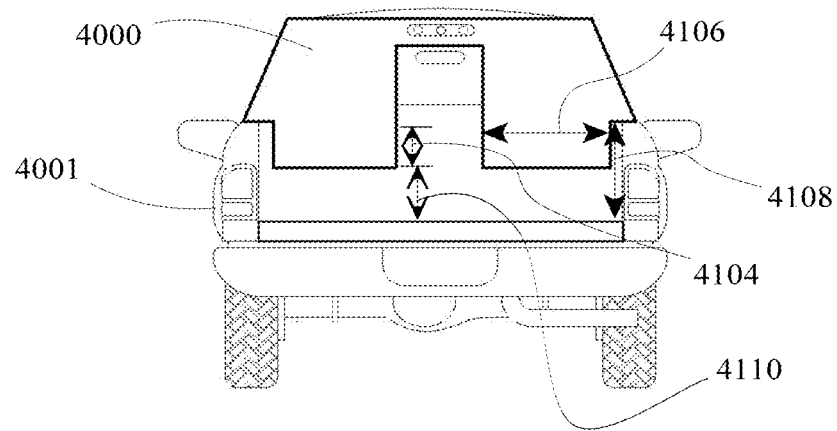
FIG. 39 is a rear view of a pickup truck with the invention mounted thereon, in this case providing the relevant metrics for the bed volume lost and the bed volume remaining available for use with large items such as wallboard.

FIG. 39 is a rear view of a pickup truck 4001 with the invention 4000 mounted thereon, in this case providing the relevant metrics for the bed volume lost and the bed volume remaining available for use with large items such as wallboard.

Depth of extension 4104 and width of extension 4106 lay out the dimensions of the extension. The width of the two extensions, plus the width of the tunnel, is less than the width of the bed. However, that distance does not have to be the entire width of the toolbox body. The body ends which sit on the side rails have to be longer. In addition, the toolbox bottom surfaces may be stepped, that is, an extension downward need not take up the entire distance from the sidewall to the tunnel, it could be stepped.

The total depth of bed volume 4108 is larger than the depth of the bottom extension 4104, which results in a space, designated the "depth of the bed volume below extension 4110". This will depend on the depth of the extension and the height of the siderails. To repeat, any extension downward may be used within the scope of the appended claims, so long as the downward extension increases storage capacity.

Figure 40:
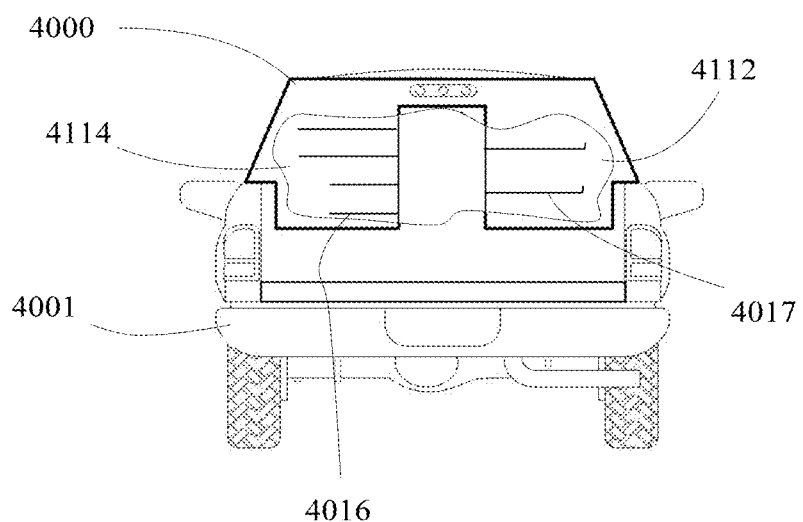
FIG. 40 is a rear view of a pickup truck with the invention mounted thereon and including a partial sectional view to show the interior of the toolbox, so as to depict that shelving within may be employed to better divide the space provided by the downward projection, which space is somewhat different than seen previously in FIGS. 2, 3, and 5.

FIG. 40 is a rear view of a pickup truck with the invention mounted thereon and including a partial sectional view to show the interior of the toolbox, so as to depict that shelving within may be employed to better divide the space provided by the downward projection, which space is somewhat different than seen previously in FIGS. 2, 3, and 5 due to the extra capacity provided by the bottom extensions. Toolbox interior spaces can be seen to be largely a right side 4112 or a left side 4114.

In this view, toolbox 4000 on pickup 4001 has multiple shelves in various places such as shelf 4016 and shelf 4017.

Unlike in previous embodiments, the shelves and other accessories of the invention may now be positioned in or on the bottom extensions. Note that in the next two embodiments, the flexibility of space and shelf placement is increased even more.

Note that the shelves may be repositioned by the user in embodiments, for the convenience of the user. Also note that the shelves can be in various different shapes and sizes. Longer shelves might be near the bottom of the extension, or shorter shelves so as to provide easier access to the spaces below them. Shelves such as 4017 may have a lip or retainer at the end.

Figure 41:
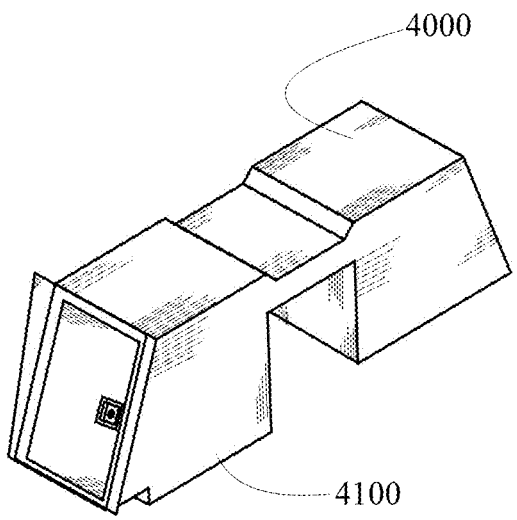
FIG. 41 is an elevated orthogonal view of a toolbox according to the present invention which would in use project slightly downward into the bed volume in one place.
Figure 42:
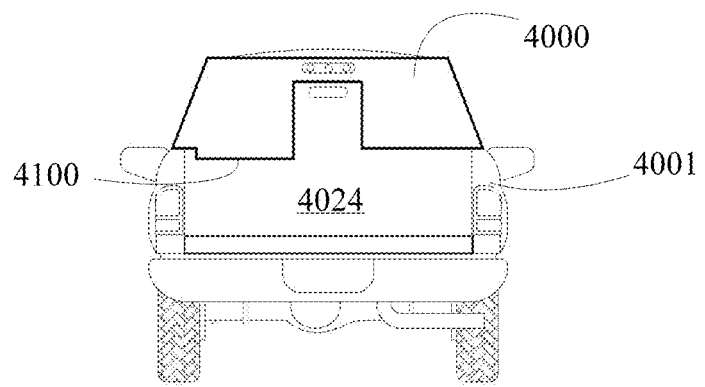
FIG. 42 is a rear view of a pickup truck with the invention mounted thereupon, showing exactly how the toolbox projects slightly downward into the bed volume.

FIG. 41 is an elevated orthogonal view of a toolbox according to the present invention which would in use project slightly downward into the bed volume in one place. FIG. 42 is a rear view of a pickup truck with the invention mounted thereupon, showing exactly how the toolbox projects slightly downward into the bed volume.

Toolbox 4000 has a slight downward extension 4100, visible in FIG. 41 but more easily seen in FIG. 42, mounted on pickup 4001.

This downward extension need not be symmetrical, nor need it take up all of the space on one bottom. Also, the bottom extension 4100 may only slight impinge into truck bed/volume 4024, or may be very close to impinging without actually being that low. In this particular example, the downward extension 4100 is not symmetrical, it takes up the entire bottom surface on the left side, and it either barely impinges into the bed space 4024 or it is barely adjacent.

The benefit of such an asymmetrical design is that special gear/tools might be provided, or the storage space within the box (see FIG. 40) might have different usages and features: one side might be filled with shelves and the other side not, or hooks, etc. Another benefit is that for cargo in the bed which is less than 4' in width, a section of the toolbox might be high enough to remain out of the way and the narrower cargo could still be used.

Figure 43:
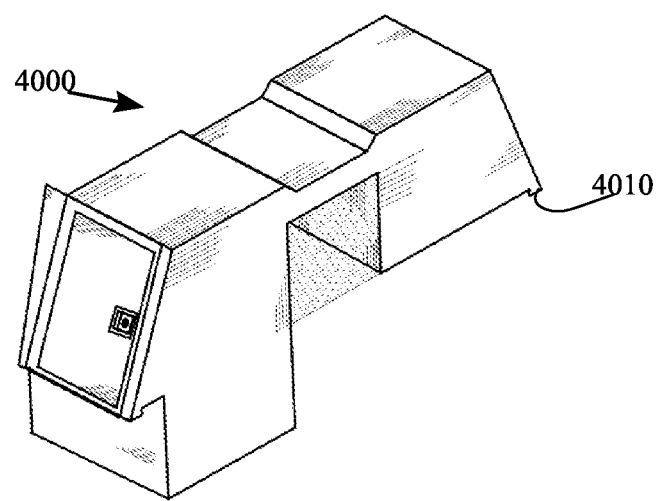
FIG. 43 is an elevated orthogonal view of a toolbox according to the present invention which would in use projects downward into the bed volume in one place.
Figure 44:
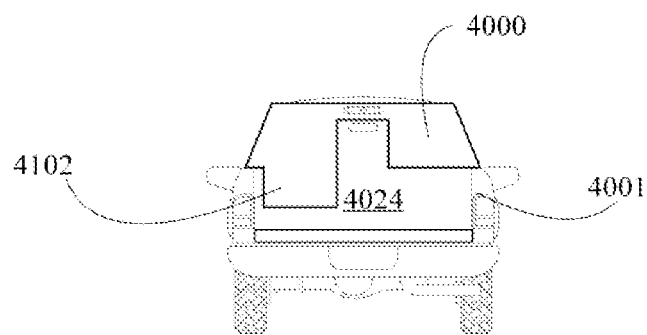
FIG. 44 is a rear view of a pickup truck with the invention mounted thereupon, showing exactly how the toolbox projects downward into the bed volume.

FIG. 43 is an elevated orthogonal view of a toolbox according to the present invention which would in use projects downward into the bed volume in one place. FIG. 44 is a rear view of a pickup truck with the invention mounted thereupon, showing exactly how the toolbox projects downward into the bed volume. Toolbox 4000 has feet 4010, as discussed above, which mount onto the siderails of pickup 4001.

Feet 4010 might in a shallower bottom extension embodiment prevent the downward extension from impinging into the truck bed/volume 4024, or they may be simply to provide better support and attachment. In this embodiment, a noticeably deeper extension 4102 is provided. This one projects downward into the bed space 4024 very definitely, is asymmetrical, and takes up the entire bottom space of one side of the toolbox. Obviously other amounts of bottom space may be projecting downwards in other embodiments, for example, 50% of one bottom surface (about ½ of that depicted in FIGS. 43 and 44) might project downward, or a single deep well might be provided, or the shape of the bottom extension might be non-rectanguloid, and especially, the depth of the bottom extension may be different (for example, between FIG. 41 versus FIG. 43). One bottom end may have more than one bottom extension projecting downward slightly or significantly into the bed volume. Both bottom ends may have multiple extensions downward. The entire surface of a bottom end need not be taken up by bottom extensions.

Figure 45:
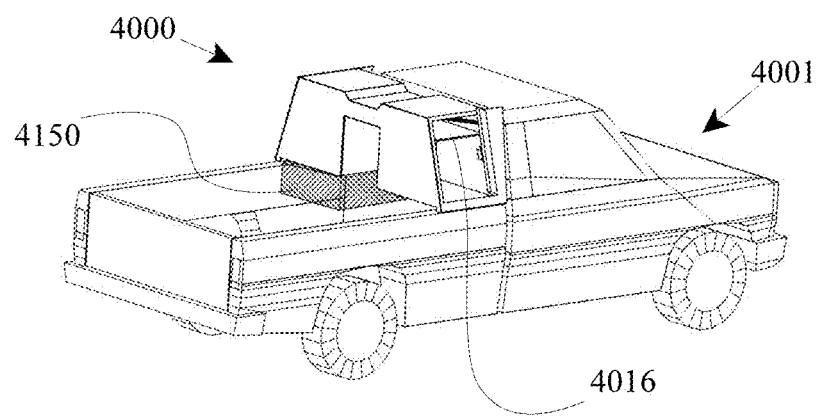
FIG. 45 is an elevated orthogonal rear view of a pickup truck, conceptually showing the truck, the invention, and the extra space which is made available by downward extensions of part of the bottom.

FIG. 45 is an elevated orthogonal rear view of a pickup truck, conceptually showing the truck, the invention, and the extra space which is made available by downward extensions of part of the bottom, 4150.

This view of toolrig 4000 shows pickup truck 4001 with the bed space visible in orthogonal dimensions. In addition to showing how the shelf 4016 may be employed on one side for a first gear/tool storage ability, this also shows a darkened rectanguloid which marks the volume of the truck bed converted to toolbox space 4150 by the invention of this embodiment. This volume does not block the safety tunnel, nor does it block access to the very bed of the pickup, that is, 4'×8' sheets of building material may still be conveyed flat in the bottom of the bed, even stacked one atop another up to the bottom of the volume 4150 (see FIG. 39 for the "depth of the bed volume below extension 4110" from straight rear view).

This does require the user to reach DOWNWARD into the converted volume 4150 (which is in essence the bottom extension such as 4102) when the door is opened on that side. This inconvenience is ameliorated by the fact that it is not necessary to reach down when the side which does NOT have an bottom extension is opened, as shown by the empty space below shelf 4016 in this diagram. In addition, it will be noticed that this downward reach is not just less than the reach downward of a traditional box, but is also done while the user is upright and standing beside the vehicle rather than standing in the bed.

Production/manufacture of the device may utilize a riveted construction in which the device may be shipped in flat pieces, even palletized or the like for transport, then assembled with little more than a rivet gun. Construction from steel alloys, aluminum, corrugated or tread pattern metal and the like, durable polymers and so on may all be possible in embodiments. Welding may be employed, molding, blow molding, etc.

The device may be painted, coated, powder coated, treated, milled, buffed, shined, chromed or otherwise surface treated.

Throughout this application, various publications, patents, and/or patent applications are referenced in order to more fully describe the state of the art to which this invention pertains. The disclosures of these publications, patents, and/or patent applications are herein incorporated by reference in their entireties, and for the subject matter for which they are specifically referenced in the same or a prior sentence, to the same extent as if each independent publication, patent, and/or patent application was specifically and individually indicated to be incorporated by reference.

Methods and components are described herein. However, methods and components similar or equivalent to those described herein can be also used to obtain variations of the present invention. The materials, articles, components, methods, and examples are illustrative only and not intended to be limiting.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art.

Having illustrated and described the principles of the invention in exemplary embodiments, it should be apparent to those skilled in the art that the described examples are illustrative embodiments and can be modified in arrangement and detail without departing from such principles. Techniques from any of the examples can be incorporated into one or more of any of the other examples. It is intended that the specification and examples be considered as exemplary only, with a true scope and spirit of the invention being indicated by the following claims.

The disclosure is provided to allow practice of the invention by those skilled in the art without undue experimentation, including the best mode presently contemplated and the presently preferred embodiment. Nothing in this disclosure is to be taken to limit the scope of the invention, which is susceptible to numerous alterations, equivalents and substitutions without departing from the scope and spirit of the invention. The scope of the invention is to be understood from the appended claims.

What is claimed is:

1. A storage box, the storage box being for use on a pickup truck having a bed, the bed having one floor, the floor having a bed width, two side rails separated by the bed width, the side rails having side rail tops defining a bed height and a bed volume, the side rail tops having an angle to the horizontal, the pickup truck also having a cab profile and a cab height, a rear view mirror, and a third brake light, the storage box comprising:

a body having a storage box length, one top surface, one front wall, one rear wall, two bottom ends and two body sides separated by a rear view tunnel passing through the body between the two body sides, the rear view tunnel having a rear view tunnel width;

at least one side having at least one bottom extension projecting downward into such bed volume and the rear view tunnel rising from such bed height to above such bed height, the rear view tunnel dimensioned and configured to allow usage of such rear view mirror, the at least one bottom extension having a bottom extension width;

the two bottom ends separated by such bed width, the two bottom ends having bottom end widths, the two bottom ends dimensioned and configured to rest upon such side rail tops;

a first partial width defined as a width of the rear view tunnel plus the two bottom end widths, the first partial width less than such bed width;

whereby when the two bottom ends rest upon such side rail tops the bottom extension projects downward into such bed volume.

2. The storage box of claim 1, further comprising:
two feet, one foot of the two feet being located at each edge of the bottom end;
each foot having a foot top attached to the respective bottom end of the box, and each foot having a foot bottom having an angle equal to such side rail tops angle;
each foot having a foot length, the foot length being greater than one half of the storage box length.

3. The storage box of claim 2, the foot length further comprising the storage box length.

4. The storage box of claim 1, for use with side rail tops having an angle to the horizontal characteristic of a second particular brand of pickup truck, the storage box further comprising:
two feet each having a foot top, foot first and second sides, and each foot having a foot bottom having an angle to equal to such side rail tops angle of such second particular brand of pickup truck;
each foot having a foot length equal to the storage box length.

5. The storage box of claim 1, further comprising:
a first transparent window of polymer material in the rear view tunnel.

6. The storage box of claim 1, wherein the storage box is further dimensioned and configured to match such cab profile of such pickup truck, whereby aerodynamic drag of the storage box is minimized.

7. The storage box of claim 1, further comprising:
a third brake light visibility feature, wherein the third brake light visibility feature further comprises:

a channel across the top surface, the channel dimensioned and configured to allow such third brake light of such pickup truck to be visible despite the presence of the storage box.

8. The storage box of claim 1, further comprising: a storage-box-to-cab fairing extending from the storage box to the cab.

9. The storage box of claim 1, further comprising:
at least one removable shelf disposed within the body.

10. The storage box of claim 1, further comprising:
at least one removable shelf disposed within at least one of the bottom extensions.

11. The storage box of claim 1, wherein the bottom extension further comprises:
a bottom extension depth into such bed volume, wherein the bottom extension depth is less than such bed height, whereby a depth of bed volume below the extension is created.

12. The storage box of claim 1, further comprising:
a bed illumination light attached to the storage box and disposed so as to illuminate such bed of such pickup truck, the bed illumination light also being attached and powered by an electrical connector.

13. The storage box of claim 1, further comprising:
a second bottom extension projecting downward into such bed volume.

14. A storage box, the storage box being for use on a pickup truck having a bed, the bed having two side rails separated by a bed width, the side rails having side rail tops defining a bed height and a bed volume, the side rail tops having an angle to the horizontal characteristic of a first particular brand of pickup truck, the pickup truck also having a cab profile and a cab height, a rear view mirror, and a third brake light, the storage box comprising:
a body having a top surface, a bottom surface, two bottom ends, a front wall, a rear wall, a storage box height, a storage box width, and a storage box length, and the storage box width equal to such bed width, each bottom end having a bottom end edge along such side rail tops, whereby the two bottom end edges are disposed separated from one another by such bed width;
two bottom extensions separated by a rear view tunnel passing through the body between the two bottom extensions;
the two bottom extensions projecting downward into such bed volume and the rear view tunnel rising above such bed height, the rear view tunnel dimensioned and configured to allow usage of such rear view mirror;
whereby when the two bottom ends rest upon such side rail tops, the two bottom extensions project downward into such bed volume.

\* \* \* \* \*